United States Patent [19]

Sasaki

[11] Patent Number: 5,717,425
[45] Date of Patent: Feb. 10, 1998

[54] INPUT APPARATUS AND METHOD HAVING IMPROVED OPERATION BEHAVIOR FOR INPUT

[75] Inventor: Kenji Sasaki, Tokyo, Japan

[73] Assignee: Ricoh Company, Ltd., Tokyo, Japan

[21] Appl. No.: 288,159

[22] Filed: Aug. 10, 1994

Related U.S. Application Data

[63] Continuation of Ser. No. 5,113, Jan. 15, 1993, abandoned.

[30] Foreign Application Priority Data

Jan. 17, 1992 [JP] Japan .................................. 4-006061
Aug. 27, 1992 [JP] Japan .................................. 4-228397

[51] Int. Cl.⁶ .................................................. G09G 5/08
[52] U.S. Cl. ........................... 345/157; 345/168; 345/145
[58] Field of Search .................................. 345/173, 168, 345/171, 172, 157, 145, 146, 163, 179; 341/22, 23, 28; 400/110, 484

[56] References Cited

U.S. PATENT DOCUMENTS

| | | | |
|---|---|---|---|
| 4,458,238 | 7/1984 | Learn | 341/20 |
| 4,531,119 | 7/1985 | Nakayama | 340/712 |
| 4,758,829 | 7/1988 | Smith, III | 340/712 |
| 5,128,672 | 7/1992 | Kaehler | 340/712 |

FOREIGN PATENT DOCUMENTS

| | | |
|---|---|---|
| 2-183293 | 7/1990 | Japan . |
| 4-215119 | 8/1992 | Japan . |

*Primary Examiner*—Xiao Wu
*Attorney, Agent, or Firm*—Lowe, Price, LeBlanc & Becker

[57] ABSTRACT

Various items (corresponding to characters, symbols, numerals, or function specifications) are displayed, the desired item being then selected, through, for example, a mouse cursor, and the selected item being thus input. Thus, neither the apparatus nor the method require a keyboard. A display changing unit changes, in a predetermined sequence, a display of a group of items from among a plurality of groups of items. The item to be input is then selected from the corresponding group of items of the plurality of groups of items through an item selecting unit.

40 Claims, 28 Drawing Sheets

FIG.2A

| あ | い | う | え | お |
|---|---|---|---|---|
| か | き | く | け | こ |

FIG.2B

| さ | し | す | せ | そ |
|---|---|---|---|---|
| た | ち | つ | て | と |

FIG.2C

| な | に | ぬ | ね | の |
|---|---|---|---|---|
| は | ひ | ふ | へ | ほ |

FIG.2D

| ま | み | む | め | も |
|---|---|---|---|---|
| や | ゆ | よ |   |   |

FIG.2E

| ら | り | る | れ | ろ |
|---|---|---|---|---|
| を | ん |   |   |   |

MOVING MOUSE CURSOR WITHOUT CLICK

MOVING MOUSE CURSOR WITHOUT CLICK

WHEN CLICK, CHARACTER CURSOR MOVE TO NEXT AREA

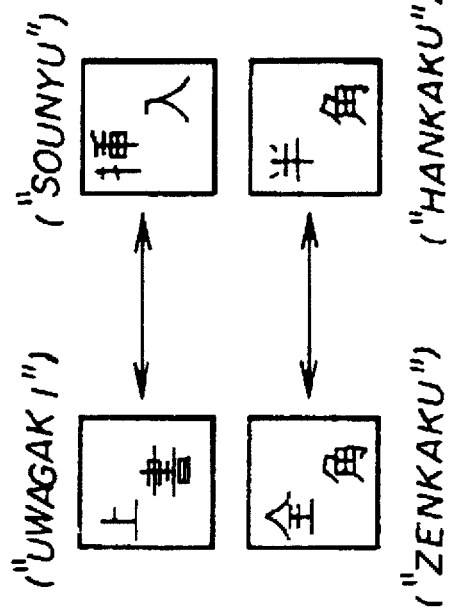

FIG. 26

| ITEM COORDINATE DATA | | | | |
|---|---|---|---|---|
| N | X | Y | KLT | KTN |
| ITEM NO. | X COORDINATE START POINT | Y COORDINATE START POINT | ITEM TYPE | ITEM DATA NO. |
| 1 | 50 | 60 | 1 | 1 |
| 2 | 50 | 260 | 2 | 3 |
| 3 | 50 | 365 | 2 | 5 |
| 4 | 50 | 520 | 2 | 6 |
| 5 | 140 | 260 | 2 | 4 |
| 6 | 140 | 365 | 2 | 2 |
| 7 | 140 | 520 | 2 | 7 |
| 8 | 280 | 260 | 3 | 31 |
| 9 | 280 | 365 | 3 | 33 |
| 10 | 280 | 520 | 4 | 9 |
| 11 | 380 | 260 | 3 | 32 |
| 12 | 380 | 365 | 3 | 34 |
| 13 | 540 | 260 | 2 | 50 |
| 14 | 540 | 365 | 2 | 55 |
| 15 | 540 | 520 | 4 | 11 |
| 16 | 645 | 260 | 2 | 51 |
| 17 | 645 | 365 | 2 | 56 |
| 18 | 715 | 520 | 5 | 30 |
| 19 | 735 | 260 | 2 | 52 |
| 20 | 735 | 365 | 2 | 57 |
| 21 | 830 | 260 | 2 | 53 |
| 22 | 830 | 365 | 2 | 58 |
| 23 | 930 | 260 | 2 | 54 |
| 24 | 930 | 365 | 2 | 59 |
| 25 | 1010 | 520 | 4 | 10 |
| 26 | 1080 | 265 | 2 | 60 |
| 27 | 1080 | 365 | 2 | 61 |
| 28 | 1250 | 260 | 3 | 62 |
| 29 | 1250 | 370 | 3 | 64 |
| 30 | 1255 | 530 | 4 | 8 |
| 31 | 1345 | 260 | 3 | 63 |
| 32 | 1345 | 370 | 3 | 65 |

FIG. 27

| KLT ITEM TYPE | XL X COORDINATE LENGTH | YL Y COORDINATE LENGTH |
|---|---|---|
| 1 | 1390 | 150 |
| 2 | 100 | 100 |
| 3 | 105 | 100 |
| 4 | 100 | 175 |
| 5 | 100 | 385 |

FIG. 28

```
KTN
ITEM
DATA NO.    FUNCTION

1       INPUT CHR DISPLAY
    2       "HIRAGANA" CONVERT MODE (MODE I)
    3       KATAKANA CONVERT MODE (MODE I)
    4       ENGLISH/NUMERAL INPUT MODE (MODE I)
    5       SYMBOL INPUT MODE (MODE I)
    6       MODE I CHANGE
    7       MODE 2 CHANGE
    8       EXECUTE
    9       DELETE
   10       JPN-CHN CHR CONVERT INPUT
   11       NO CONVERT INPUT

30       SPACE CODE INPUT
   31       ⌐  CODE INPUT
   32       ⌐° CODE INPUT
   33       ⌐  CODE INPUT
   34       ⌐° CODE INPUT

50       CHR KEY CODE 0 INPUT
   51       CHR KEY CODE 1 INPUT
   52       CHR KEY CODE 2 INPUT
   53       CHR KEY CODE 3 INPUT
   54       CHR KEY CODE 4 INPUT
   55       CHR KEY CODE 5 INPUT
   56       CHR KEY CODE 6 INPUT
   57       CHR KEY CODE 7 INPUT
   58       CHR KEY CODE 8 INPUT
   59       CHR KEY CODE 9 INPUT

60       DISPLAY SEQUENCE FORWARD
   61       DISPLAY SEQUENCE BACKWARD
   62       CURSOR LEFTWARD
   63       CURSOR RIGHTWARD
   64       RETREAT
   65       CHR DELETE
```

FIG.29

| | | | | | | | |
|---|---|---|---|---|---|---|---|
| 0100 あ | 0102 あ | | 0400 ま | | 2100 A | 2102 a |
| 0110 い | 0112 い | | 0410 み | | 2110 B | 2112 b |
| 0120 う | 0122 う | | 0420 む | | 2120 C | 2122 c |
| 0130 え | 0132 え | | 0430 め | | 2130 D | 2132 d |
| 0140 お | 0142 お | | 0440 も | | 2140 E | 2142 e |
| 0150 か | 0151 が | | 0450 や | 0452 や | 2150 F | 2152 f |
| 0160 き | 0161 ぎ | | 0460 ゆ | 0462 ゆ | 2160 G | 2162 g |
| 0170 く | 0171 ぐ | | 0470 よ | 0472 よ | 2170 H | 2172 h |
| 0180 け | 0181 げ | | | | 2180 I | 2182 i |
| 0190 こ | 0191 ご | | | | 2190 J | 2192 j |
| 0200 さ | 0201 ざ | | 0500 ら | | 2200 K | 2202 k |
| 0210 し | 0211 じ | | 0510 り | | 2210 L | 2212 l |
| 0220 す | 0221 ず | | 0520 る | | 2220 M | 2222 m |
| 0230 せ | 0231 ぜ | | 0530 れ | | 2230 N | 2232 n |
| 0240 そ | 0241 ぞ | | 0540 ろ | | 2240 O | 2242 o |
| 0250 た | 0251 だ | | 0550 を | | 2250 P | 2252 p |
| 0260 ち | 0261 ぢ | | 0560 ん | | 2260 R | 2262 r |
| 0270 つ | 0271 づ | 0272 っ | | | 2270 Q | 2272 q |
| 0280 て | 0281 で | | | | 2280 S | 2282 s |
| 0290 と | 0291 ど | | | | 2290 T | 2292 t |
| 0300 な | | | 2400 1 | 2401 1 | 2300 U | 2302 u |
| 0310 に | | | 2410 2 | 2411 2 | 2310 V | 2312 v |
| 0320 ぬ | | | 2420 3 | 2421 3 | 2320 W | 2322 w |
| 0330 ね | | | 2430 4 | 2431 4 | 2330 X | 2332 x |
| 0340 の | | | 2440 5 | 2441 5 | 2340 Y | 2342 y |
| 0350 は | 0351 ば | 0353 ぱ | 2450 6 | 2451 6 | 2350 Z | 2352 z |
| 0360 ひ | 0361 び | 0363 ぴ | 2460 7 | 2461 7 | | |
| 0370 ふ | 0371 ぶ | 0373 ぷ | 2470 8 | 2471 8 | | |
| 0380 へ | 0381 べ | 0383 ぺ | 2480 9 | 2481 9 | | |
| 0390 ほ | 0391 ぼ | 0393 ぽ | 2490 0 | 2491 0 | | |

INPUT APPARATUS AND METHOD HAVING IMPROVED OPERATION BEHAVIOR FOR INPUT this application is a continuation of U.S. patent application Ser. No. 08/005,113, filed Jan. 15, 1993, now abandoned in favor of the present patent application.

BACKGROUND OF THE INVENTION

The present invention relates to an input apparatus and an input method in which various items (corresponding to characters, symbols, numerals, or function specifications) are displayed, the desired item being then selected, through, for example, a mouse cursor, and the selected item being thus input. Thus, neither the apparatus nor the method requires a keyboard.

Information processing apparatuses such as: word processors, and desk top publishing apparatuses, i.e. those apparatuses being currently used as office automation equipment, have become portable and have become compact due to efforts to meet the corresponding public needs.

Generally, these information processing apparatuses have keyboards having many keys thereon, the keyboards being used for manual input of information such as characters, symbols, and numerals.

The keyboard is very important for input of information corresponding to various character kinds such as for example characters that constitute the Japanese language.

Such a keyboard has to have many keys and a considerable size, so that an operator can operate it efficiently.

Keyboard size requires a space where the keyboard is to be placed whether it is being used or not. The space may be provided in the information processing apparatus, the size of the keyboard thus interferes with miniaturization of the apparatus.

To solve the problem, an effort has been made to create methods in which the number of keys on the keyboard can be reduced.

One example of a method to reduce the number of keys on the keyboard comprises inputting information by specifying a numerical data, a decimal point of the numerical data being moved as desired, and a numeral of each figure being varied as desired, the desired numerical data being thus input. In this method, only three keys such as: a first key for specifying a position of the decimal point, a second key for specifying the numeral of each figure, and a third key for specifying an item to be input, which item the specified numerical data belongs to, are sufficient to determine the input values for the various input items. The method is disclosed in Japanese Patent Publication No.2-27685.

However, the method is effective only for inputting limited information such as numerical data. Thus this method may not be generally used.

Another method for solving the above-mentioned problem caused by the size of the keyboard has been provided as apparatuses having varied shapes such as the so-called "lap-top" apparatuses in which an LCD display device and the corresponding keyboard can be folded unitarily. While this method may improve portability of the apparatuses. The apparatuses that can apply this method, i.e. the lap-top apparatuses are limited depending on functions and/or hardware volumes to be contained therein.

Another method for solving the problem caused by the size of the keyboard has resulted an input apparatus in which various items (corresponding to characters, symbols, numerals, or function specifications) are displayed, the desired item being then selected, through, for example, a mouse cursor, and the selected item being thus input. Such apparatuses do not require a keyboard. Japanese Patent Laid-Open Application No.4-215119 discloses a character inputting apparatus having such functions.

However, the display screen of such an inputting apparatus, on which screen the various items to be selected are displayed, normally has a smaller size than that of the normal keyboard. Thus, it is difficult to display on the display screen items corresponding to all the keys arranged on a normal keyboard, in the same arrangement.

Further, displaying items corresponding to all the keyboard keys on a small-sized display screen, by reducing the size of the arrangement of the items, may interfere with understanding of the contents of each item displayed. Further, such display may cause a degrading in how much information can be expressed in each item because a display space allocated to each item is reduced in size.

To solve the problem caused by a small display size, the display space allocated to each item may be increased by reducing a number of items displayed on the screen in one display screen. This method enables easy understanding of contents displayed, however it becomes difficult to display all items displayed on the screen in one display screen.

To solve the problem caused by a small display size, a group of items of a plurality of groups of items may be displayed in one display screen, and the display of the group of items can be changed to another display of another group of items as a result of a specification specifying display of a desired group of items. However, in this method, such a specification may be troublesome so as to degrade an efficient inputting of information.

Input of desired information by selecting from among many items by means of a mouse cursor may degrade input efficiency as compared with a keyboard. Thus the efficiency in producing documents may be degraded. Further, a workload born by an operator may be increased as a result of an increase in a number of actions required for pushing a mouse button when information is input through the mouse, or as a result of an area on the display where the mouse cursor has to move being wider.

As mentioned above, input of items (corresponding to information of characters, symbols, numerals, or function specifications), as a result of selecting the appropriate item through the mouse cursor may facilitate miniaturization of the present apparatus, but it may degrade operation efficiency when the operator inputs the information.

SUMMARY OF THE INVENTION

An object of the present invention is to facilitate producing of documents as a result of inputting (items corresponding to characters, symbols, numerals, or function specifications), without using a keyboard, wherein the operation efficiency when the information is input of the producing is maintained at the present level.

To achieve the object of the present invention, the input apparatus according to the present invention comprises:

display changing means for changing, in a predetermined sequence, a display of individual groups of items from among a plurality of groups of items; and item selecting means for selecting the item to be input from among items in the corresponding displayed group of items of the plurality of groups of items.

The input apparatus may further comprise another function wherein the display changing means periodically changes the display at predetermined intervals, until a specification is input.

By this configuration, display of the group of items, from among the plurality of groups of items, is changed in a predetermined sequence. Thus, an operation of specifying the desired group of items to be displayed can be prevented from becoming troublesome. The operator has only to wait until the desired display of the group of items is displayed as a result of the periodic changing of the display in the predetermined sequence.

Other objects and further features of the present invention will become more apparent from the following detailed description when read in conjunction with the accompanying drawings.

BRIEF DESCRIPTION OF THE DRAWINGS

FIGS. 2A, 2B, 2C, 2D, and 2E show illustrations of groups of items displayed in the display of the soft keyboard shown in FIG. 1 when the display of the group of characters is successively changed;

FIGS. 5A, 5B, and 5C show illustrations of mode displays shown in the soft keyboard of FIG. 1 when a mode is changed as a result of clicking a mouse button;

FIG. 26 shows a table of item coordinate-data corresponding to items arranged on the soft keyboard shown in FIG. 9;

FIG. 27 shows a table of item types of the item coordinate-data shown in FIG. 26 and X/Y coordinates indicating sizes in respective types of the item types;

FIG. 28 shows a table of functions corresponding to the item data No. shown in FIG. 26;

FIG. 29 shows a table of one example of function codes (character codes) corresponding to a part of information of characters, symbols, and numerals.

DESCRIPTION OF THE PREFERRED EMBODIMENT

Figure 1:
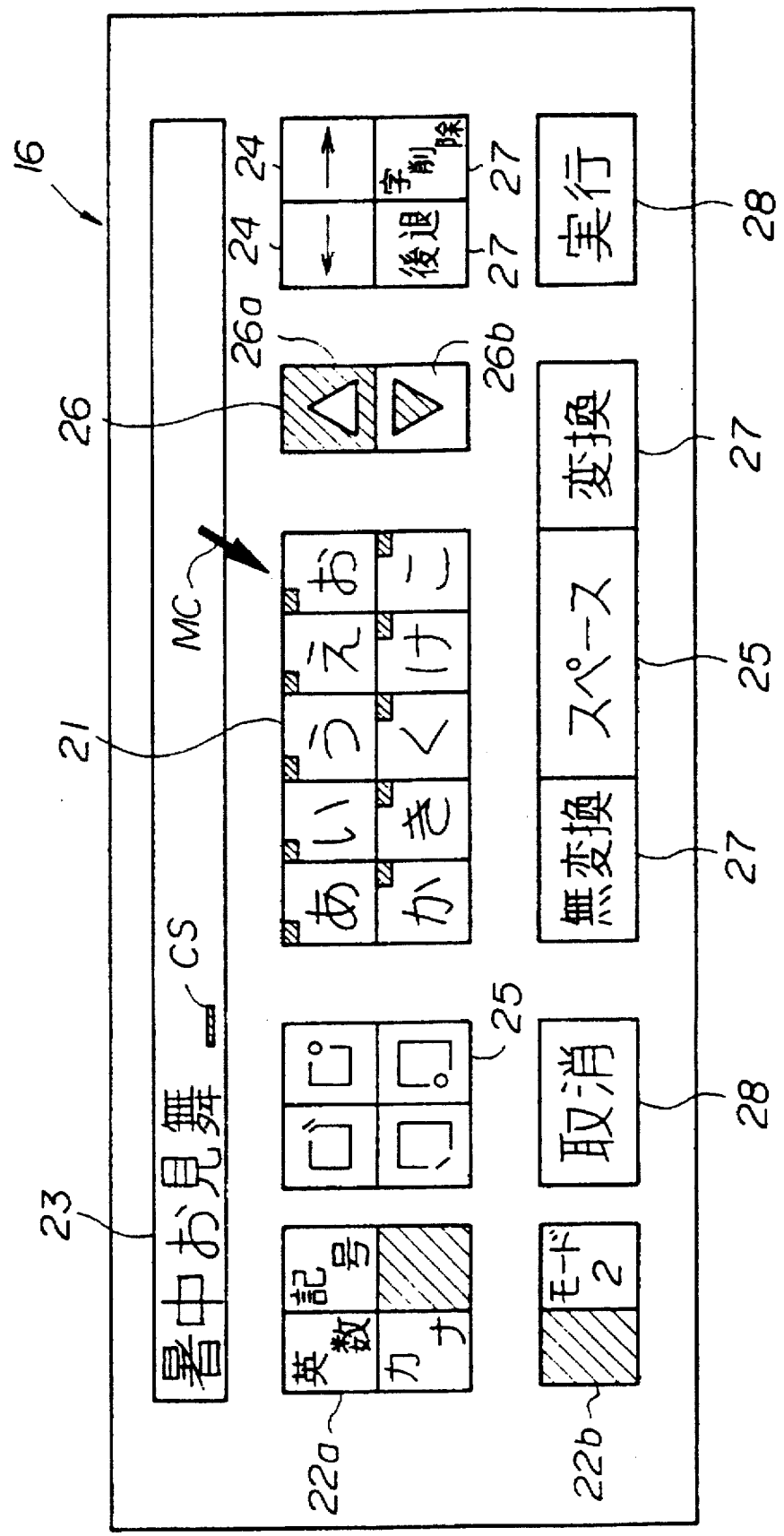
FIG. 1 shows an illustration of a soft keyboard displayed through a display device of an inputting apparatus according to an embodiment of the present invention.

An operation method of an inputting apparatus according to an embodiment of the present invention and a display control method for a soft keyboard displayed though a display unit employed by the inputting apparatus will be described now with reference to FIG. 1. The soft keyboard is not an actual keyboard but it is made of an image displayed on a screen.

The soft keyboard 16 has a selecting character-display portion 21 on which respective groups of display characters of a plurality of groups of display characters are displayed by turns, the plurality of groups of display characters including information such as: a plurality of characters, symbols, numerals and other information. The soft keyboard further has input mode change portions 22a and 22b which selectively change the kinds of the information displayed so as to be one of for example characters, symbols, numerals or other information, and selectively change input methods for inputting the information.

The inputting apparatus further employs a mouse cursor MC for inputting a desired item (display character) selected by means of the mouse cursor MC from among the displayed characters group displayed on the selecting character-display portion 21, wherein the displayed character wherein the mouse cursor MC is located when a mouse button corresponding to the mouse cursor MC is clicked is selected. The mouse cursor MC may be moved in accordance with a movement of a mouse having the mouse button, the motion of the mouse being controlled by the operator's hand.

Further, the soft keyboard 16 has a produced document display portion 23 in which a document (document sentence) produced as a result of input of the information (corresponding to characters, symbols, numerals or other information input by the mouse cursor) is combined together and displayed. The soft keyboard 16 further has a character cursor motion specifying portion 24 for moving a character cursor CS indicating an indicating position of the selectively input information (corresponding to characters, symbols, numerals, or other information). The soft keyboard 16 further has special character display portion 25 for displaying frequently used information from among the information (corresponding to characters, symbols, numerals or other information)

The soft key board 16 further has a character display sequence direction specifying portion 26 for specifying a direction of a display sequence in which each of the respective groups from among the plurality of groups of display characters is, in turn, displayed on the selecting character-display portion 21. The soft keyboard 16 further has an input character processing specifying portion 27 for specifying processes to be performed on the information (corresponding to characters, symbols, numerals or other information), the processes being selectively input through the mouse, the processes being such as: a conversion from the Japanese characters to the Chinese characters, and other modifications. The soft keyboard 16 further has a process control specifying portion 28 for controlling processes such as: fixing the information (corresponding to characters, symbols, numerals or other information) selectively input through the mouse; registering the produced document; and terminating/continuing the document production.

As shown in parts of the input mode change portions 22a and 22b of FIG. 1, these parts being hatched in FIG. 1, the color of the display area of each item having been selected through the mouse is inverted after the selection, that is the selected item is displayed in different colors, the inverted color item corresponding to the hatched parts in FIG. 1.

While the mouse cursor MC is not located within an area corresponding to the selecting character-display portion 21, the displayed group of the plurality of groups of characters to be displayed on the selecting character-display portion 21 is automatically changed successively at predetermined time intervals.

In an example of the successive display changing, as shown in FIGS. 2A through 2E, the group of characters displayed is changed among: the group of display characters belonging to the a-line and the Ka-line shown in FIG. 2A, the group of display characters belonging to the Sa-line and the Ta-line shown in FIG. 2B, and so on in FIGS. 2C through 2E respectively.

Figure 3A:
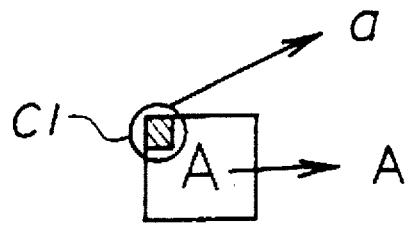
FIGS. 3A, 3B, 3C and 3D show illustrations of character item displays in the soft keyboard, such as shown in FIG. 1, wherein the lowercase letter, the small letter, the double consonant character, the sonant character, the p-sound character, or the umlaut character is produced.
Figure 3B:
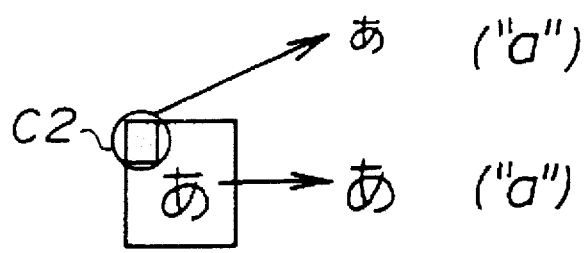
Figure 3C:
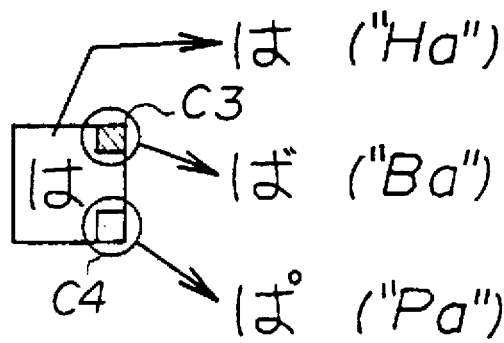

In the present specification and the accompanying claims, the expressions of the Japanese language and Japanese characters may be represented by the corresponding expressions of the Roman letters, for example, a, Ha, Ba, and Pa respectively shown in FIGS. 3B and 3C and UWAGAKI, SOUNYU (meaning "inserting"), ZENKAKU (meaning "in a full size"), AND HANKAKU respectively shown in FIGS. 5B and 5C.

Because the display of the characters from which the desired character is to be selected is automatically changed as mentioned above, the user is not required to effect manual operations so as to change the display, and the efficiency of the operation when the information is input can be thus improved.

When the mouse cursor MC is moved so as to be located in the area corresponding to the selecting character-display portion 21, the above-mentioned automatic display change in the selecting character-display portion 21 is stopped. Thus, the display of the selecting character portion 21 is made to constantly display the group of characters displayed on the selecting character-display portion 21 when the automatic display change was stopped. It then becomes possible to select and then to input the desired character from among the current characters. Further, when the mouse cursor MC moves so as to go out from an area corresponding to the selecting character-display portion 21, the automatic display change of the selecting character-display portion is restarted.

In this method employing the automatic display change, and the change stopping to keep a desired display of the group of display characters from which group the desired character is to be selected, an efficiency of the operation for selecting of information can be improved as a result of the reduced motion of the mouse cursor MC. Further, because the desired information is displayed for the minimum period of time required for understanding the contents of the display, an efficiency of the operation is improved and the displayed information is understandable.

Further, the direction of the display changing sequence between the directions A and B shown in FIGS. 2A through 2E is determined due to the specification specified through the character display sequence direction specifying portion 26. In an example of the direction specification of the display changing sequence, in the case where the key 26a of the character display sequence direction specifying portion 26 has been selected as a result of the corresponding mouse clicking, a part of the key 26a having been thus inverted in display color to the inverted state (in which the background of the corresponding area is black), the sequence of displaying of the respective groups of display characters is changed to be in the direction A shown in FIGS. 2A through 2E successively.

In this method employing the specification of the display changing direction, the desired display changing direction can be selected in the display of the characters from which the desired character is selected. Thus, speedy display of the desired group of display characters, and the input operation can be continued without interruption, a smooth operation being thus realized.

A method for changing the above-mentioned display changing direction in the display of groups of display characters will be now described. This change of display changing direction can be performed by clicking the mouse button while the mouse cursor MC is located outside of the display areas corresponding to the following portions in the soft keyboard 16: the selecting character-display portion 21, the input mode change portions 22a and 22b, the produced document display portion 23, the character cursor motion specifying portion 24, the special character display portion 25, the character display change direction specifying portion 26, the input character processing portion 27, and the process control portion 28. Then, after the display changing direction has been changed due to the clicking of the mouse button in the above mentioned status, the display of the groups of characters is changed so as to occur in a sequence the reverse of the sequence in which the display change occurred before the clicking.

In an example of the changing of the displaying direction, in the case as shown in FIG. 1, where the key 26a is in the inverse display state in which the background in the corresponding area is black, when the clicking operation in the state where the mouse cursor MC is in the above-mentioned position is executed, the key 26b assumes the inverse display state, while the key 26a returns to a normal display state, and thus the display in the selecting character-display portion 21 of the respective groups of display characters is changed successively to occur in a sequence (corresponding to the key 26b) the reverse of the sequence in which the display changing sequence occurred before the clicking.

Some characters of Japanese characters (hiragana and katakana) are respectively the original clear sound characters assigned to display items, but which may respectively become, as a result of predetermined marks being attached thereto, the sonant characters, and the p-sound characters. Further, some characters of Japanese characters (hiragana and katakana) may have the double consonant characters attached thereto. The item display areas allocated for characters of the category of characters respectively have small areas for specifying that the corresponding marks are to be attached to the corresponding clear sound characters.

In the example shown in FIG. 3C, the mouse button being clicked when the mouse cursor MC is located in the character display area for the Japanese character Ha (excluding small areas C3 and C4) results in the Japanese character Ha being input. The mouse button being clicked when the mouse cursor MC is located in the small area C3, that is for specifying the mark for the sonant character being input, provided in the character display area for the Japanese character Ha results in the Japanese character Ba that is the sonant character corresponding to the Japanese character Ha, being input. The mouse button being clicked when the mouse cursor MC is located in the small area C4, that is for 10 specifying the mark for the p-sound character being input, provided in the character display area for the Japanese character Ha results in the Japanese character Pa that is the p-sound character corresponding to the Japanese character Ha, being input.

Further, some characters of Japanese characters (hiragana and katakana) may be reduced in size so as to become the corresponding double consonant characters. The item display areas allocated for these characters respectively have small areas for specifying input of the corresponding characters of reduced sizes, so as to input the corresponding double consonant characters.

In the example shown in FIG. 3B, the mouse button being clicked when the mouse cursor MC is located in the character display area for the Japanese character a (excluding a small area C2) results in the Japanese character a, in a normal size, being input. The mouse button being clicked when the mouse cursor MC is located in the small area C2, provided in the character display area for the Japanese character a, which small area C2 for specifying the corresponding character being input with reduced size, results in the Japanese character a, in a smaller size, being input, which character is a double consonant character corresponding to the Japanese character a in the normal size.

Further, some characters of the European characters may be reduced in sizes so as to become the corresponding lowercase letters. The item display areas allocated for these characters respectively have small areas for specifying inputting the corresponding lowercase letters.

In the example shown in FIG. 3A, the mouse button being clicked when the mouse cursor MC is located in the character display area for the English character A (excluding a small area C1) results in the character A being input in a capital-letter size. The mouse button being clicked when the mouse cursor MC is located in the small area C1, that is for specifying the corresponding character being input with a reduced size, provided in the character display area for the character A results in the character a in the smaller size, being input that is a lowercase letter corresponding to the letter A is input.

Further, some characters of the European characters may respectively have the umlauts attached above them.

Figure 3D:
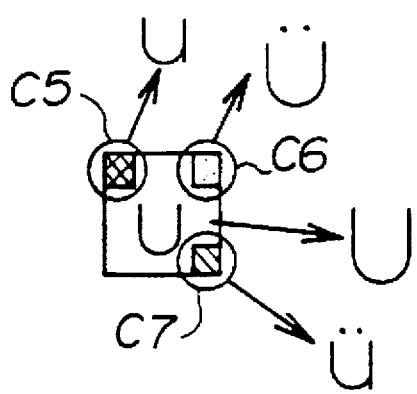

In the example shown in FIG. 3D, the mouse button being clicked when the mouse cursor MC is located in the character display area for the European character U (excluding small areas C5, C6, and C7) results in the character U in the capital size being input. The mouse button being clicked when the mouse cursor MC is located in the small area C5, provided in the character display area for the character U, which small area C5 is for specifying the character of reduced size, results in the character u in the lowercase being input, that is, it results in a lowercase letter corresponding to the character U, being input. The mouse button being clicked when the mouse cursor MC is located in the small area C6, provided in the character display area for the character U, which small area C6 is for specifying the umlaut being attached, results in the character Ü , that has the umlaut attached to the corresponding character U in the capital size, being input. The mouse button being clicked when the mouse cursor MC is located in the small area C7, provided in the character display area for the character U, which small area C7 is for specifying the umlaut being attached and reducing in the size, results in the character ü, that has the umlaut attached to the corresponding character U in the small size, being input.

In the method employing the small area in the item display area, the characters such as: the sonant characters, the p-sound characters, and the double consonant characters, in the Japanese hiragana and katakana; and the lowercase letter of the European character and the umlaut can be input by one selecting operation without extra operation such as those for changing modes. Thus, troublesome operations for inputting various characters can be reduced.

Further, when the mouse cursor MC is located on an item corresponding to a character of the group of the display characters displayed on the selecting character-display portion 21, the information corresponding to the item on which the mouse cursor MC is located is displayed on the produced document display portion 23 corresponding to a position indicated by the character cursor CS.

Figure 4A:
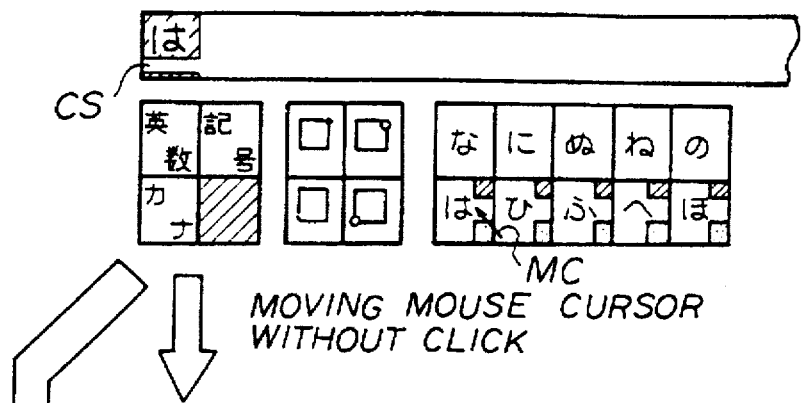
FIGS. 4A, 4B, 4C, and 4D show illustrations of parts of the soft keyboard shown in FIG. 1 when a character item, that is, an item corresponding to a character is displayed on a produced document display portion, on which character item a mouse cursor is located.
Figure 4B:
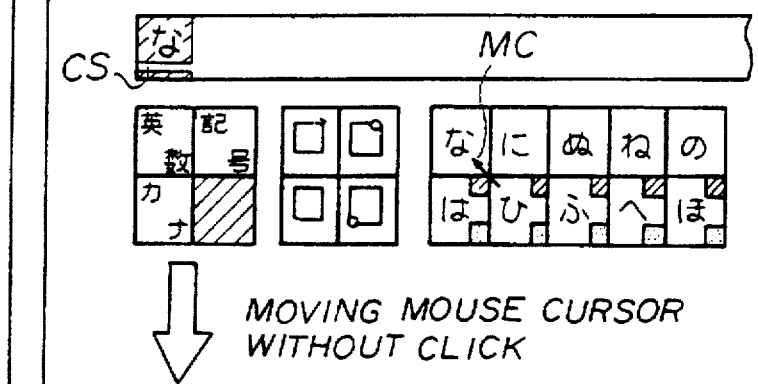

In an example of display on the produced document display portion 23, as shown in FIGS. 4A and 4B, when the mouse cursor MC moves from the character Ha to the character Na, the display on the produced document display portion 23 in the position of the character cursor CS is automatically changed from display of Ha to display of the Na accordingly.

Figure 4C:
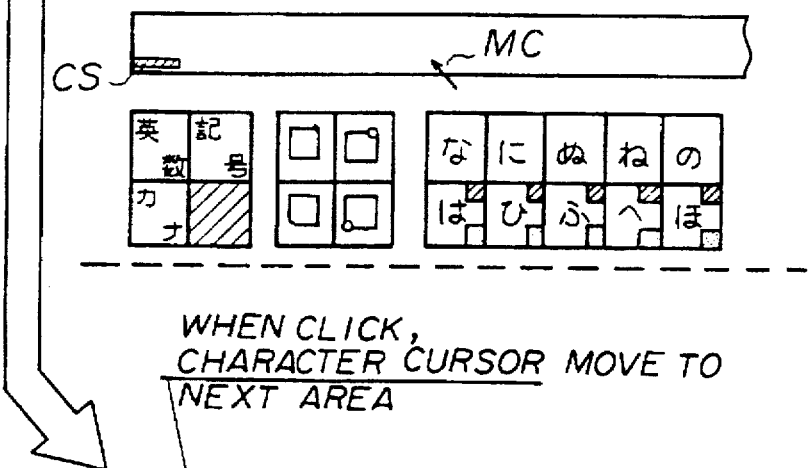
Figure 4D:
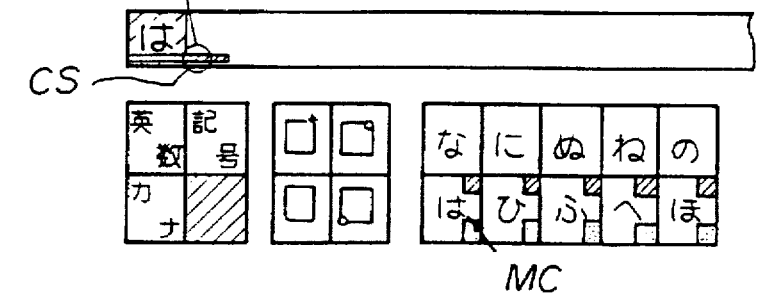

Further, as shown in FIG. 4C, when the mouse cursor MC is moved out of the selecting character-display portion 21 displaying the group of the display characters, without having clicked the mouse button while the mouse cursor MC was located on the portion 21, the display at the position of the character cursor CS in the produced document display portion 23 becomes blank. Then, if the mouse button is clicked while the mouse cursor MC is again located on the character Ha, as shown in FIG. 4D, the character Ha becomes displayed at the position of the character cursor CS, and the character cursor CS moves to the next input position.

Therefore, the recognition of the position of the mouse cursor MC can be made easier, in which position the character is displayed in the selecting character-display portion 21. This results in reducing the number of operations for inputting the character information.

When, a mode of the input mode change portion 22a is selected through the mouse cursor MC, the groups of display characters of information corresponding to the selected mode are then displayed on the selecting character display portion 21.

In an example of the mode, changing operation, in the case where a hiragana of the input mode change portion 22a has been selected, and an item of the English/numeral group is currently selected, the display characters group corresponding to the English characters and/or numerals is displayed in turn.

Therefore, because only the display character groups corresponding to the selected mode are displayed, the user can recognize at a glance which mode is currently selected when the user inputs the characters, smooth, efficient character input being thus realized.

When one of two function names is displayed on a function name display area for indicating each function, clicking of the mouse button results in another of the two function names being then displayed.

In an example of the display changing due to mouse clicking, as shown in FIGS. 5B and 5C, the UWAGAKI mode display is changed to the SOUNYU mode display, and the ZENKAKU mode display is changed to the HANKAKU mode display, respectively as a result of mouse clicking (clicking of the mouse button).

Therefore, because the current mode is displayed, the current mode being thus easily recognized, the mode changing to the desired mode is executed smoothly.

Figure 6:
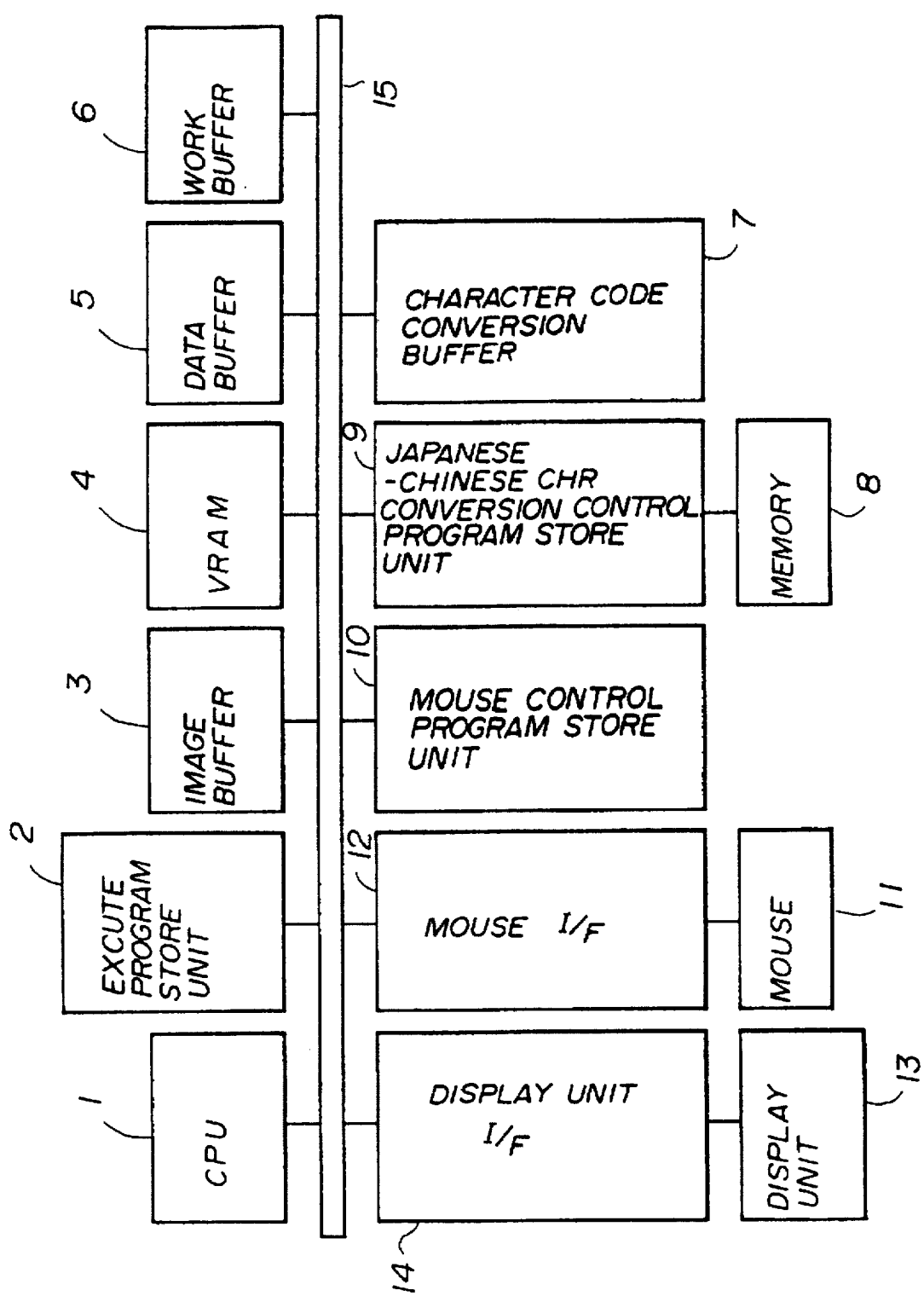
FIG. 6 shows a block diagram of the inputting apparatus according to the embodiment of the present invention.

An internal configuration of the inputting apparatus according to the embodiment of the present invention will be now described with reference to FIG. 6.

The inputting apparatus has a CPU 1, an execution program storing unit 2, an image buffer 3, a VRAM 4, a data buffer 5, a work buffer 6, a character code conversion buffer 7, a memory 8, a Japanese-Chinese character conversion control program storing unit 9, a mouse control program storing unit 10, the mouse 11, a mouse interface (I/F) 12, a display unit 13, a display unit interface (I/F) 14, and a bus 15.

The CPU 1 processes control of the entire inputting apparatus and executes various processes.

The execution program storing unit 2 is a memory for storing execution programs of which the CPU 1 executes the control and the various processes.

The image buffer 3, the VRAM 4, the data buffer 5, and the word buffer 6 are memories for temporarily storing data necessary for displaying various images through the display unit 13 respectively.

The character code conversion buffer 7 is a memory for storing character data obtained as a result of converting corresponding character codes.

The memory 8 is a memory in which data can be written, from which data can be read and which is used in the Japanese-Chinese character conversion process.

The Japanese-Chinese character conversion (conversion from Japanese characters to corresponding Chinese characters) program storing unit 9 is a memory for storing a control program for processes in which the Japanese characters comprising hiragana or katakana are converted into corresponding Chinese characters.

The mouse control program storing unit 10 is a memory for storing a control program for executing control regarding the mouse, such as control of a motion of the mouse cursor.

The mouse 10 is a device for inputting position data for specifying a position of the mouse cursor.

The mouse interface (I/F) 12 carries out processes for control of the mouse 11.

The display unit 13 is a display device employing devices such as a CRT and an LCD, for displaying the above-mentioned soft keyboard.

The display unit interface (I/F) 14 controls processes for displaying an image through the display unit 13.

The bus 15 comprises communication lines for transferring various data between the respective units.

Figure 7:
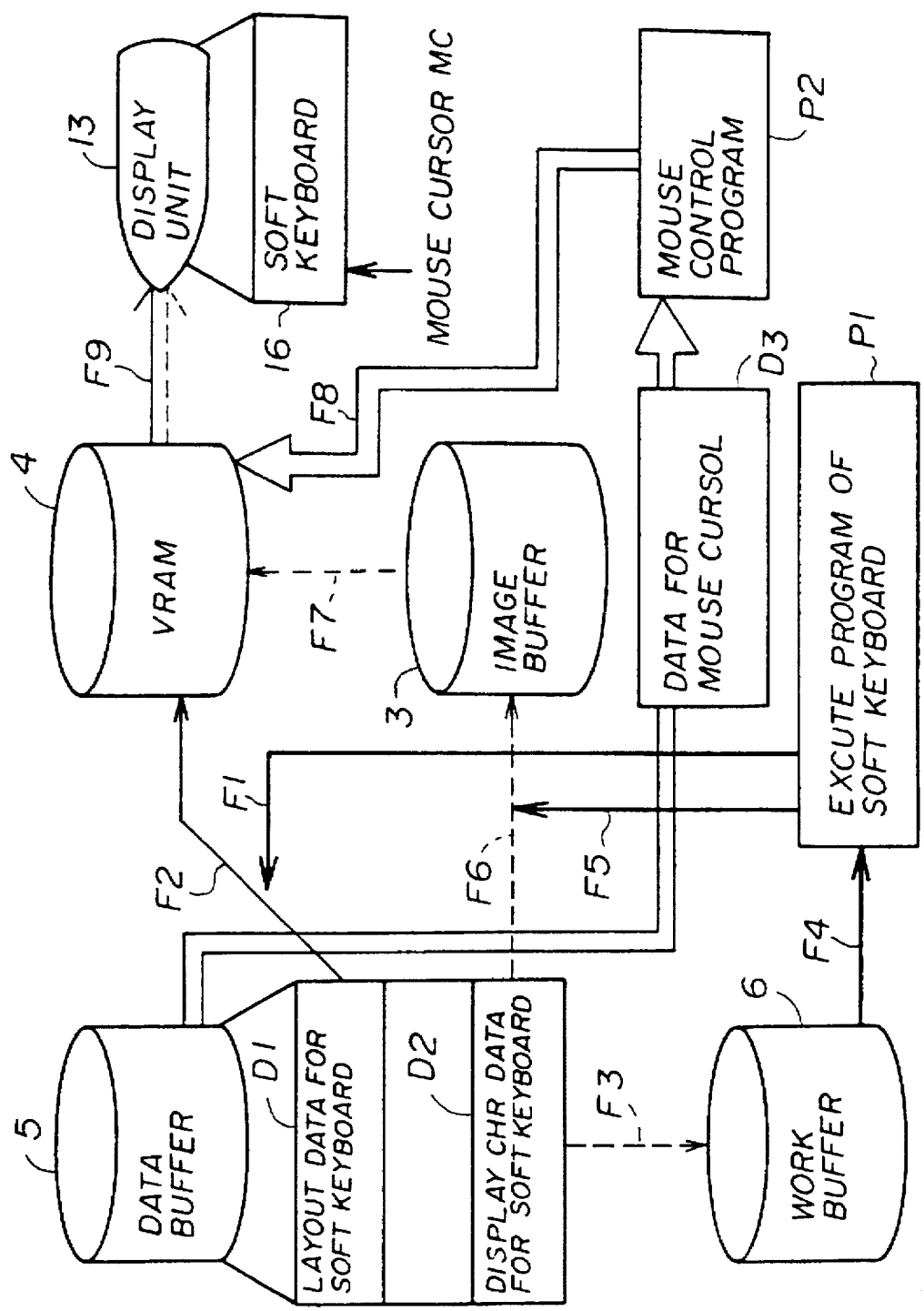
FIG. 7 shows an illustration of operations in which the inputting apparatus shown in FIG. 1 displays the soft keyboard through a display unit.

Operations in the display unit 13 of the inputting apparatus for displaying the soft keyboard will be now described with reference to FIG. 7.

The data buffer 5 is previously provided with stored layout data D1 for forming the shape of the soft keyboard 16. The data buffer 5 is further previously provided with stored display character data D2 for the soft keyboard, the character data D2 corresponding to data for: the plurality of groups of display characters comprising information items such as characters, symbols, numerals, function specifications and other information; and various function names.

The CPU 1 reads, from the execution program storing unit 2, an execution program P1 for displaying the soft keyboard 16, the CPU 1 then starting the inputting apparatus based on the execution program P1.

The CPU 1 reads, from the data buffer 5, the layout data D1 (flows F1, hereinafter, the term "flow" will be omitted, so that, for example, we will write "F1" instead "the flow F1" in FIG. 7), then drawing a shape of (that is, storing shape information corresponding to) the soft keyboard 16 in the VRAM 4 (F2).

Then, The CPU 1 reads, from the data buffer 5, the display character data D2, then transferring it to the work buffer 6 (F3) so as to be copied thereon.

That is, in the work buffer 6, input modes such as hiragana, sounyu, and zenkaku, and initial values of display character-group codes are stored, the initial value of display character-group codes then, as they are to be used in an initial display, being then transferred to the execution program P1 (F4).

Through processes according to the execution program P1, based on the conditions for the initial display, which conditions have been transferred from the work buffer 6 (F5), the display character data D2 for the groups of the display characters and the function names are transferred to the image buffer 3 (F6).

Then, contents of the display character data D2 stored in the image buffer 3 are transferred to the VRAM 4 (F7), the data D2 being then combined with the shape of the soft keyboard 16 having been drawn according to the layout data D1.

Further, through processes according to the mouse control program P2 stored in the mouse control program storing unit 10, the data D3 regarding the mouse cursor is read from the data buffer 5. Then, based on the data D3, the mouse cursor MC is drawn at a predetermined position in the VRAM 4 (F8).

Then, contents having been drawn on the VRAM 4 are transferred to the display unit 13 (F9), the soft keyboard 16 then being displayed.

Figure 8:
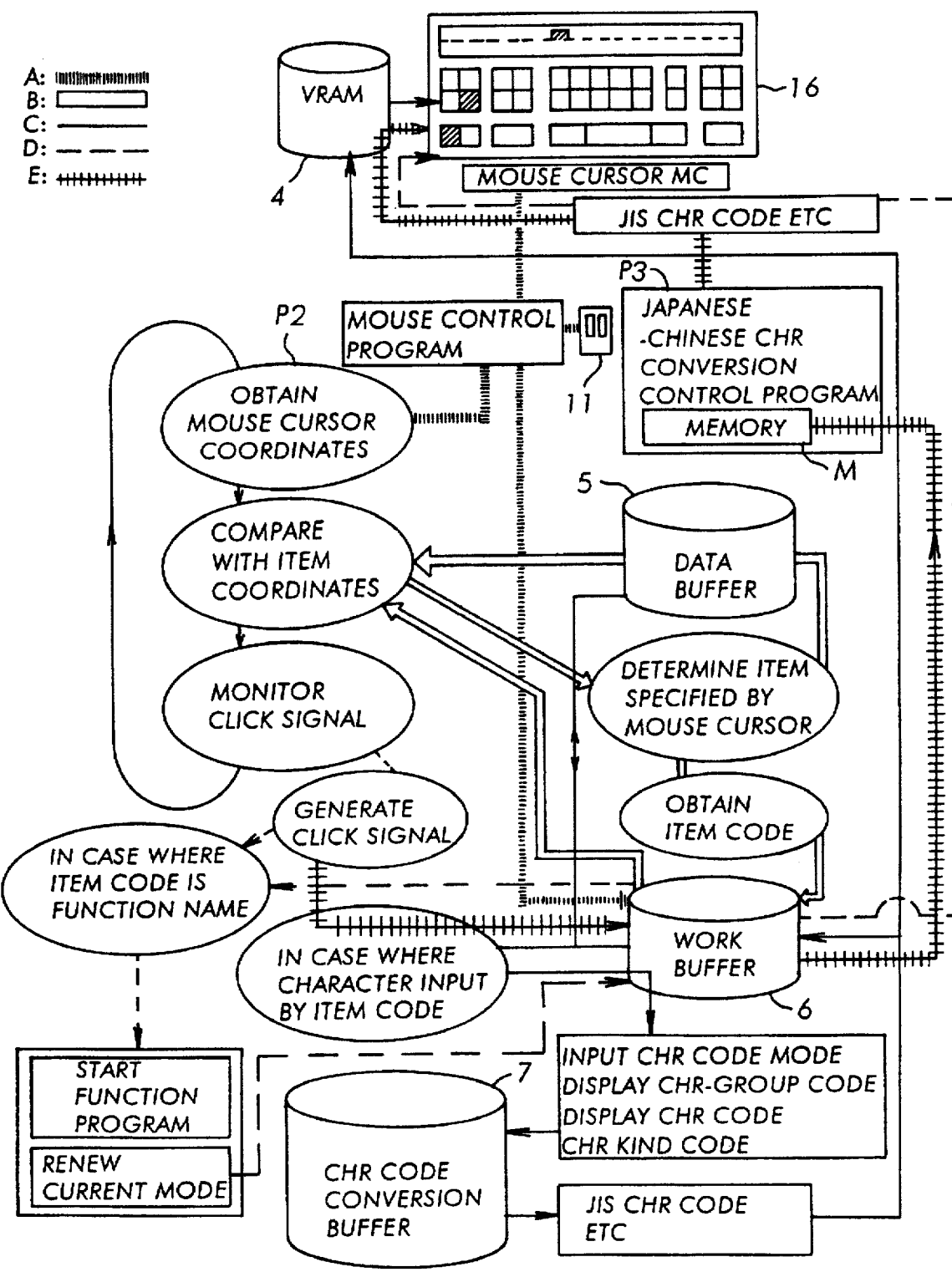
FIG. 8 shows an illustration of operations in which information is input through a mouse cursor and a corresponding mouse button after displaying the soft keyboard as a result of the operations shown in FIG. 7.

Operations by which the information is input through the mouse after the soft keyboard has been displayed will be described below with reference to FIG. 8.

Processes in which the information is input through the mouse (hereinafter, inputting action through the mouse will be referred to as "mouse event") after the soft keyboard has been displayed comprise repeating of the following processes: obtaining coordinate data corresponding to a position of the mouse cursor MC, comparing the above coordinate data with coordinate data corresponding to positions of the respective items on the soft keyboard, and monitoring whether or not a click signal resulting from the pushing action of the mouse button (this action is referred to as "clicking") occurs. The processes are repeated until the inputting through the soft keyboard is finished (hereinafter, this finishing action will be referred to as "close").

Through processes according to the mouse control program P2, the coordinate data corresponding to the position of the mouse cursor MC is always obtained (constantly updated), the obtained coordinate data being then transferred to the word buffer 6 (flows of lines "A").

Then, the coordinate data corresponding to the position of the mouse cursor MC from the work buffer 6 and the coordinate data corresponding to the positions of the respective items located on the soft keyboard from the data buffer 5 are compared with each other, item with a position corresponding to that where item the mouse cursor MC is located being thus determined, a function code of information corresponding to the determined item being then transferred to the work buffer 6 (flows of lines "B").

In a case where the transferred function code denotes inputting the corresponding character, a display character code corresponding to (the character corresponding to) the determined item of the soft keyboard 16 is then obtained, the obtained display character code being then converted to the corresponding JIS code, the obtained JIS code being then transferred to the VRAM 4, the corresponding character being then displayed through the display unit 13, and the corresponding character being transferred to the work buffer 6 (flows of lines "C").

Then, when the mouse button is clicked, in a case where function code obtained from the work buffer 6 denotes execution of a function, the execution program corresponding to the function of the obtained function code is started. Depending on a kind of the corresponding function, a current function mode may be renewed, the resulting function code (may be resulting from the renewal) being then transferred to the work buffer 6. Depending on contents of the execution program of the above function, the display processes are executed (flows of lines "D").

Further, when the mouse button is clicked, in a case where a the function code obtained from the work buffer 6 denotes inputting of the character, a JIS code corresponding to the character is transferred, from the work buffer 6, to the memory M of the Japanese-Chinese character conversion program P3, the transferred JIS code then being a material to be processed by the Japanese-Chinese character conversion (flows in lines "E").

Figure 9:
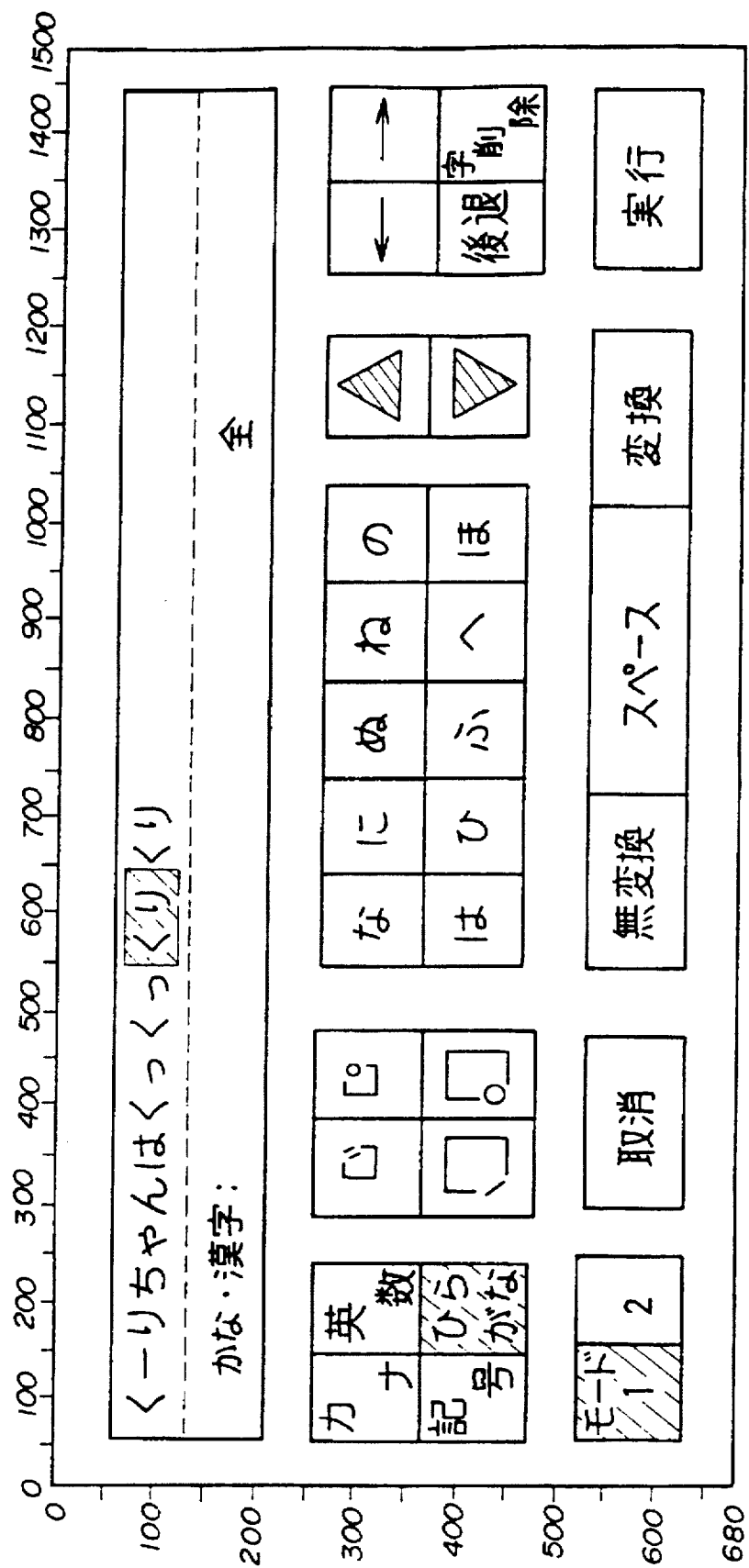
FIG. 9 shows an example of a layout of the soft keyboard shown in FIG. 1.

In a layout of the soft keyboard shown in FIG. 9, the soft keyboard has a scale of 680 degrees from the top to the bottom and a scale of 1500 degrees from the left to the right on the coordinate plane, as shown in FIG. 9, in which keyboard items corresponding to various information are arranged.

In FIG. 26, predetermined coordinate data corresponding to all items to be displayed on the soft Keyboard and other predetermined data, the data being used for drawing the items and for comparing with the position of the mouse cursor.

In FIG. 27, respective sizes have been predetermined for respective item types.

As mentioned above, the standardization of the sizes of the items to be displayed on the soft keyboard was executed by predetermining from a view point of data management for each respective item's type, that is most efficient.

In FIG. 28, functions are related to respective item data numbers.

The mouse button being clicked while the mouse cursor is located on an item results in execution of the function of the item data number corresponding to the clicked item.

In this embodiment of the present invention, the function codes have been previously determined, that is, the respective item data numbers correspond to the respective function codes, the function codes acting so as to start execution of the corresponding function program to be executed.

As shown in FIG. 29, the respective function codes, each having a 4 figures numeral corresponding thereto, are assigned to respective information(i.e. hiragana character).

Figure 10:
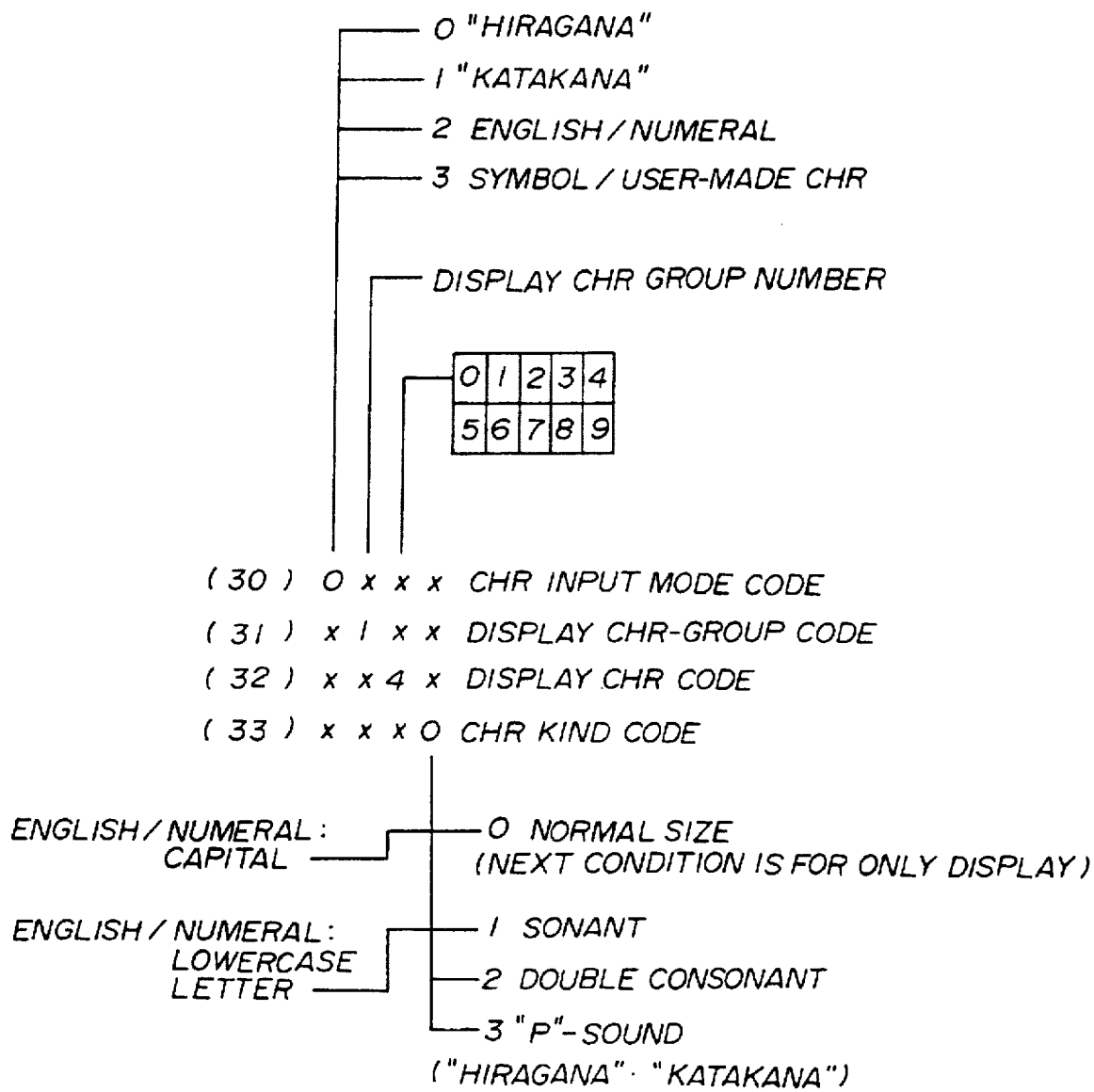
FIG. 10 shows an illustration of meanings of character codes.

Meanings of character codes each having the 4 figures numeral related thereto, as shown in FIG. 29, will be now described with reference to FIG. 10.

The first figure of each character code is an input character mode code, one of numerals 0, 1, 2, and 3 being thus assigned to the mode code, these numerals corresponding to hiragana, katakana, English/numeral, and symbol/user-made character.

The second figure of each character code is a display character-group code indicating which group of display characters the present information belongs to, the relative numbers having been assigned starting from the first of them when the number of groups of the plurality of groups of display characters does not exceed N (a number expressible by one digit) groups.

The third figure of each character code is one of 10 item numbers 0 through 9 corresponding to respective display characters in one display of a group comprising 10 characters.

The fourth figure comprises a kind number indicating whether or not the corresponding character is one that may be one of the sonant characters, p-sound characters, or the double consonant characters, and a kind number of the small letter (or the lowercase letter).

An example of the arrangement in the soft keyboard of items corresponding to the character information will be described now with reference to FIGS. 11A through 11C.

Figure 11A:
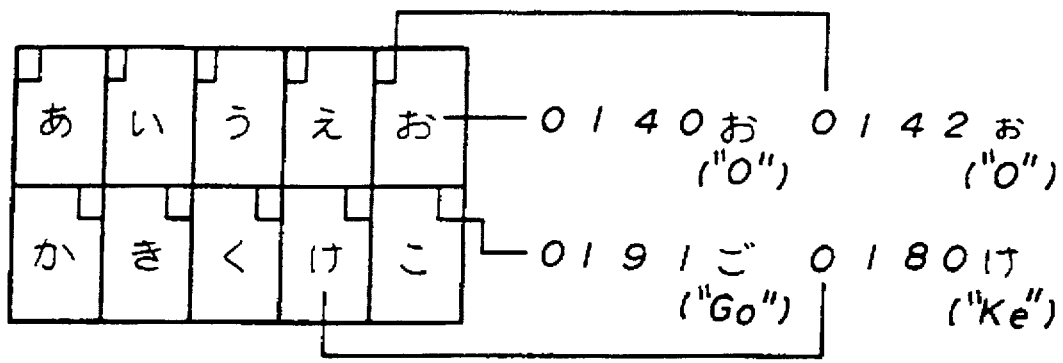
FIGS. 11A, 11B and 11C show illustrations in examples of arrangements of items (corresponding to character information) displayed on the soft keyboard shown in FIG. 1.
Figure 11B:
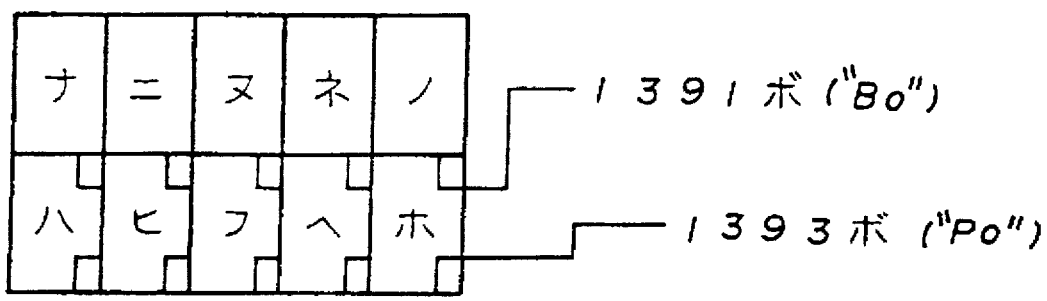
Figure 11C:
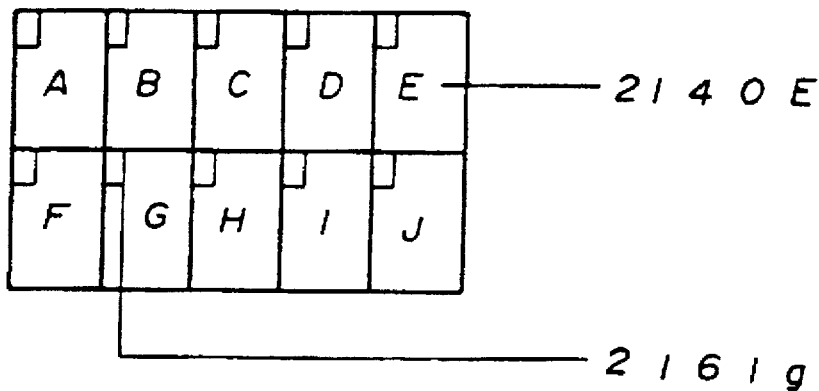

In the example of FIG. 11A, the function code "0140" is assigned to the item of the hiragana o; in the example of FIG. 11B, the function code "1391" is assigned to the item of the sonant character Bo; and in the example of FIG. 11C, the function code "2140" is assigned to the item of the English character "E".

Figure 12:
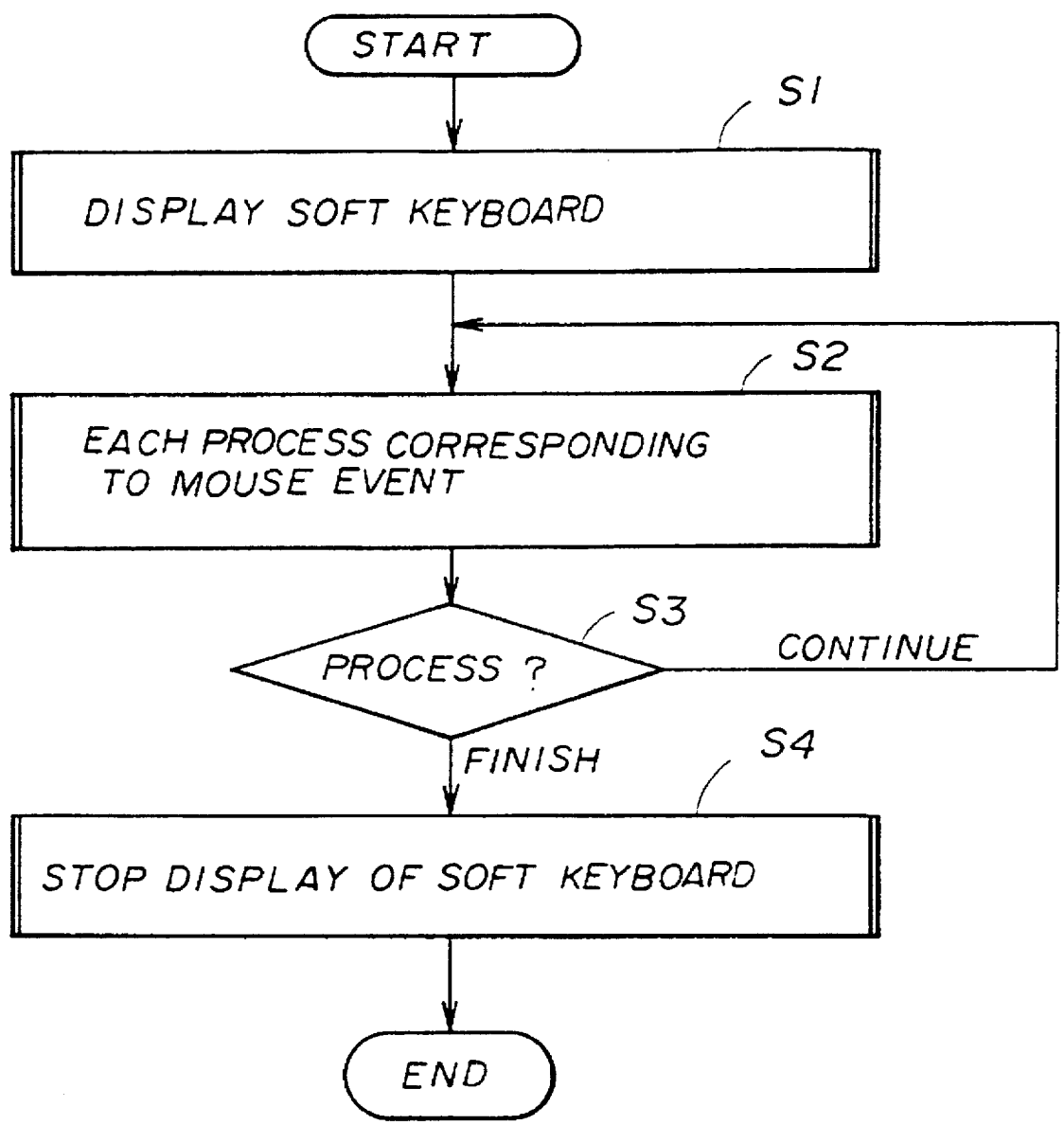
FIG. 12 shows an operation flow chart of processes in the inputting apparatus shown in FIG. 6.

Further, processes executed in the inputting apparatus according to the embodiment of the present invention will be now described with reference to FIGS. 12 through 19. As shown in FIG. 12, after the inputting apparatus is started, processes for displaying the soft keyboard are executed in step S1, (Hereinafter, the term "step" will be omitted, so that, for example, an expression "S1" will be used instead of "the step S1".) the mouse event being then monitored and processes corresponding to the mouse events being then executed (S2).

Then, it is determined (S3) whether the processes are to be continued or to be finished. When they are to be continued in S3, again the mouse events are monitored and the corresponding processes are executed in S2. When they are to be finished in S3, the display of the soft keyboard is stopped, the present processes being then finished (S4).

Figure 13:
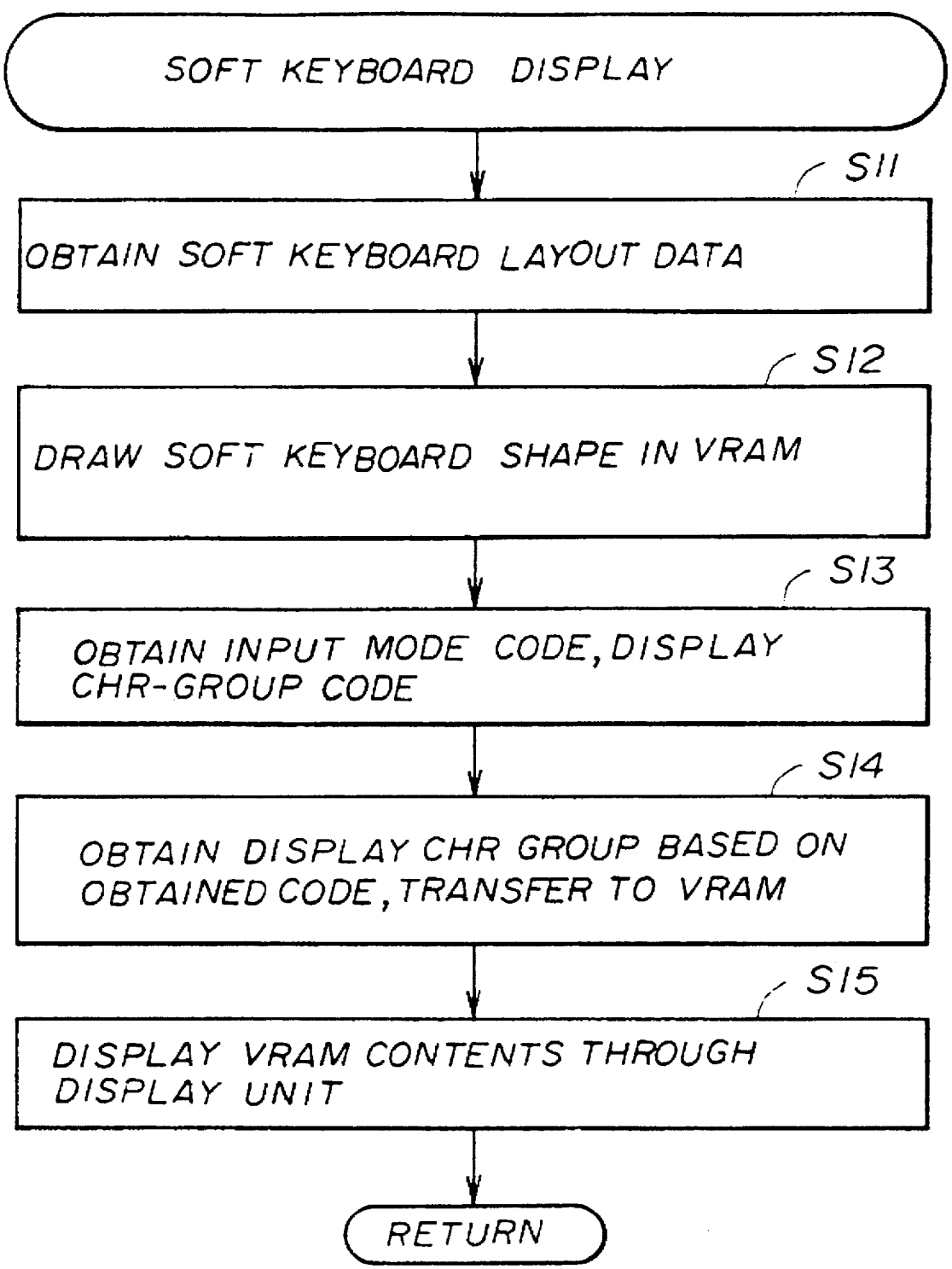
FIG. 13 shows an operation flow chart of processes for displaying the soft keyboard in the inputting apparatus shown in FIG. 6.

The processes for displaying the soft keyboard will be now described with reference to FIG. 13.

The layout data corresponding to the soft keyboard 16 is obtained (S11), the shape of the soft keyboard 16 being then drawn in the VRAM 4 (S12). Then, the input character mode code and the display character-group code are obtained (S13), the group of display characters based on the obtained codes being then obtained and the group being then transferred to the VRAM 4 (S14). Then, the contents of the VRAM 4 are displayed in the display unit (S15), the operation being then returned to the processes shown in FIG. 12.

The processes for monitoring the mouse event, each process corresponding to the mouse event being then executed will be now described with reference to FIG. 14.

The coordinates of the position specified by the mouse cursor MC are obtained (S21), processes for changing the display of the group of display characters being then executed (S22), processes for assigning the item specified by the mouse cursor being then executed (S23).

Then, it is determined (S24) whether or not the contents of a function code corresponding to an item specified by the mouse cursor are input, then, when (S24) determines Yes, processes obtaining the character kind code (S25), and processes for displaying the corresponding display character on the produced document display portion are then executed (S26).

When No is obtained in S24, the steps S25 and S26 are not executed. Then, it is determined (S27) whether or not the mouse button is clicked, then when the mouse button has not been clicked, the operation is returned to the processes shown in FIG. 12.

When the mouse button is clicked in S27, it is determined (S28) whether or not the contents of the function code corresponding to the clicked item indicate inputting of a character, then when Yes is obtained in S28, the JIS code corresponding to the character is transferred to the Japanese-Chinese character conversion memory (S29), and the operation is then returned to the processes shown in FIG. 12.

When the contents of the function code corresponding to the clicked item do not indicate inputting of a character (No in S28), the function programs including processes for the Japanese-Chinese character conversion are then started (S30), the operation flow being then returned to the processes shown in FIG. 12.

Figure 15:
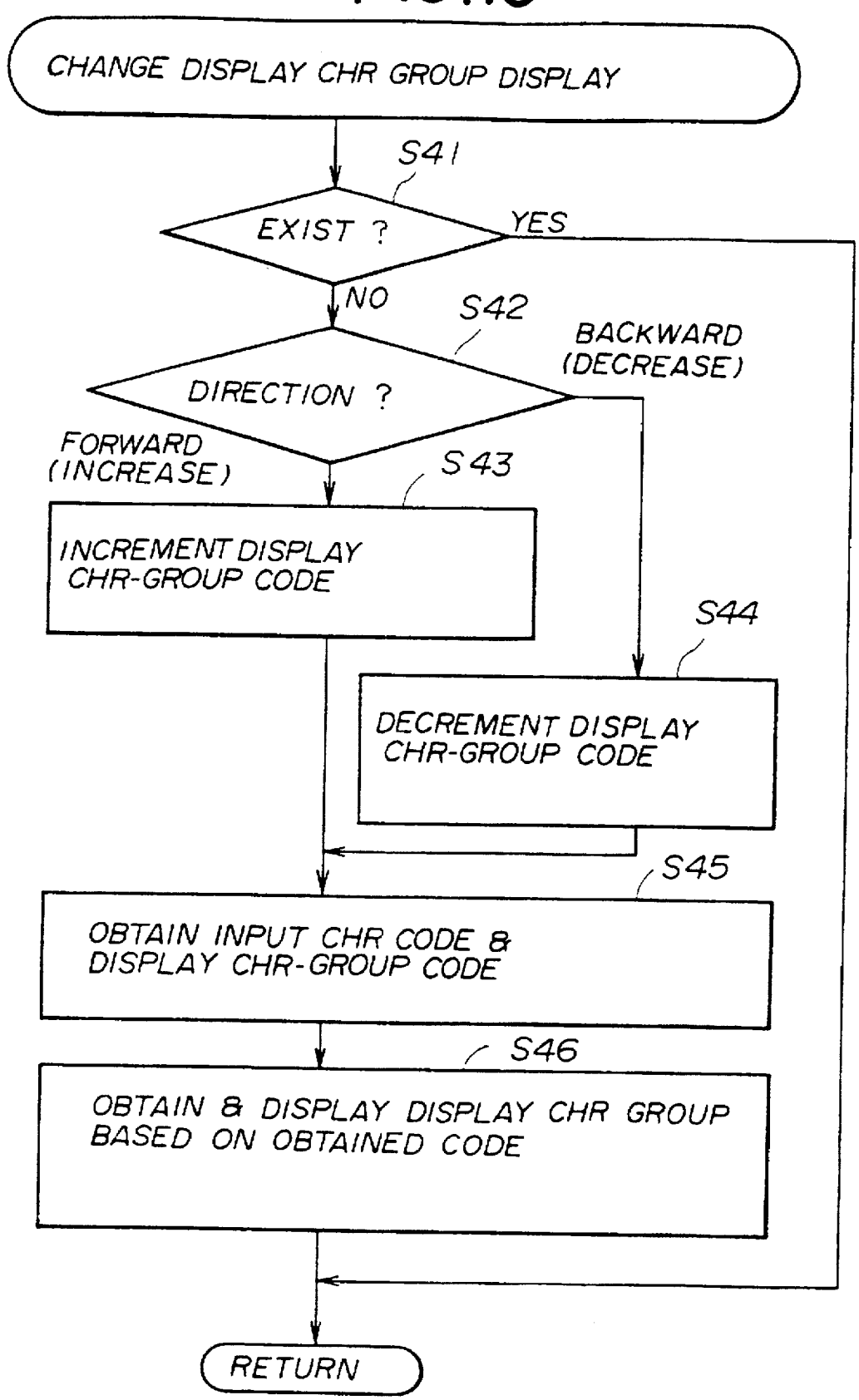
FIG. 15 shows an operation flow chart of processes for changing the displayed group of characters in the inputting apparatus of FIG. 6.

The processes for changing the display of the group of display characters will be now described with reference to FIG. 15.

Whether or not the mouse cursor MC is located within the display area corresponding to the selecting character-display portion as determined in S41, then when it is located therein, the operation flow is then returned to the processes shown in FIG. 12. Further, when the mouse cursor MC is not located within the display area of the selecting character-display portion (No in S41), it is determined (S42) in which direction of the changing sequence the display of the group of display characters is changed.

In the determination in S42, when the forward direction is determined as a result of the corresponding specification, the display character-group code is incremented (or changed forward) (S43); further, when the backward direction is determined, the display character-group code is then decremented (or changed backward) (S44); the input character mode code and the display character-group code being then obtained (S45).

Figure 14:
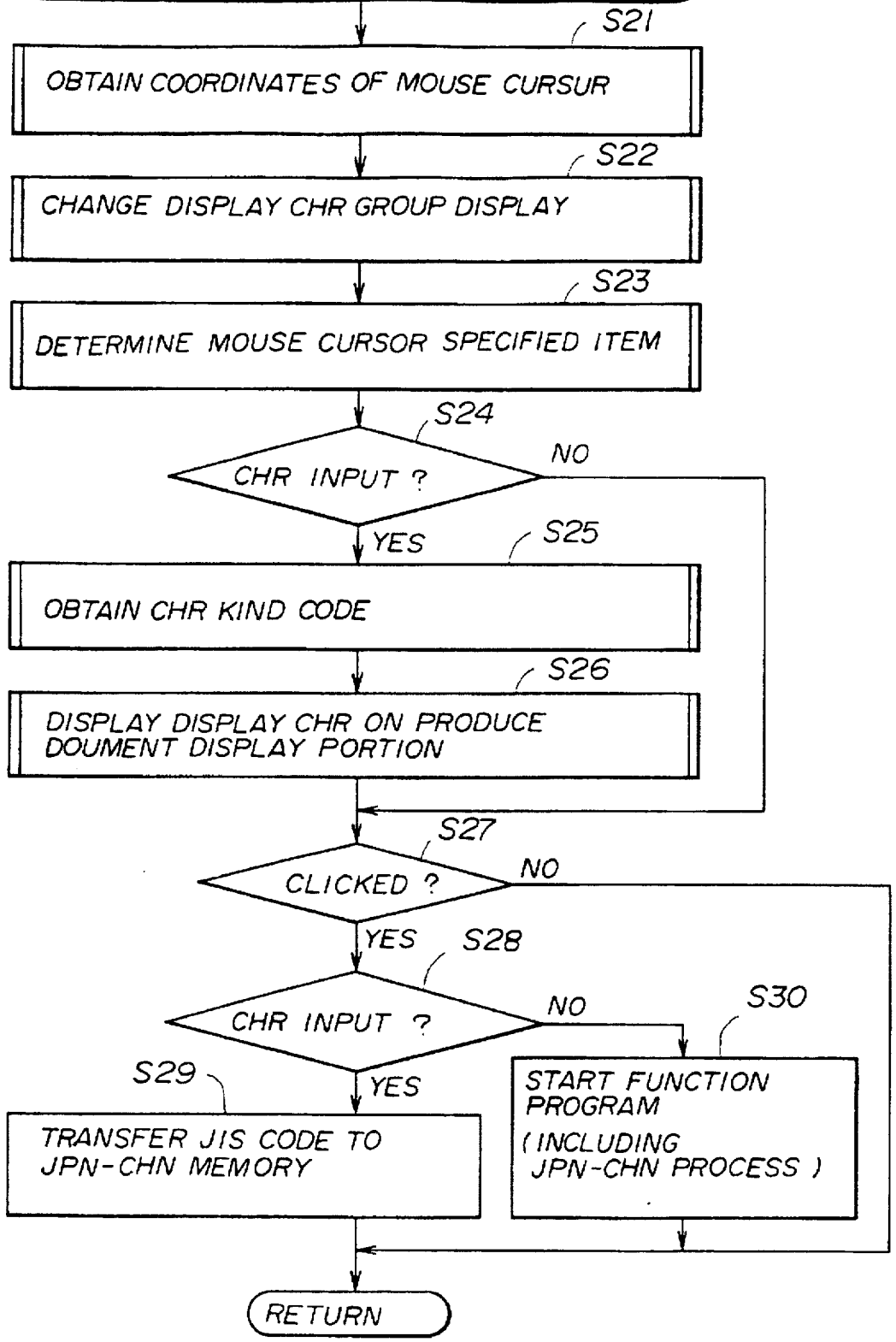
FIG. 14 shows an operation flow chart of processes executed as a response to a mouse event (inputting action through the mouse) in the inputting apparatus shown in FIG. 6.

Then, after the group of display characters based on the obtained code is displayed (S46), the operation flow is then returned to the processes shown in FIG. 14.

Figure 16:
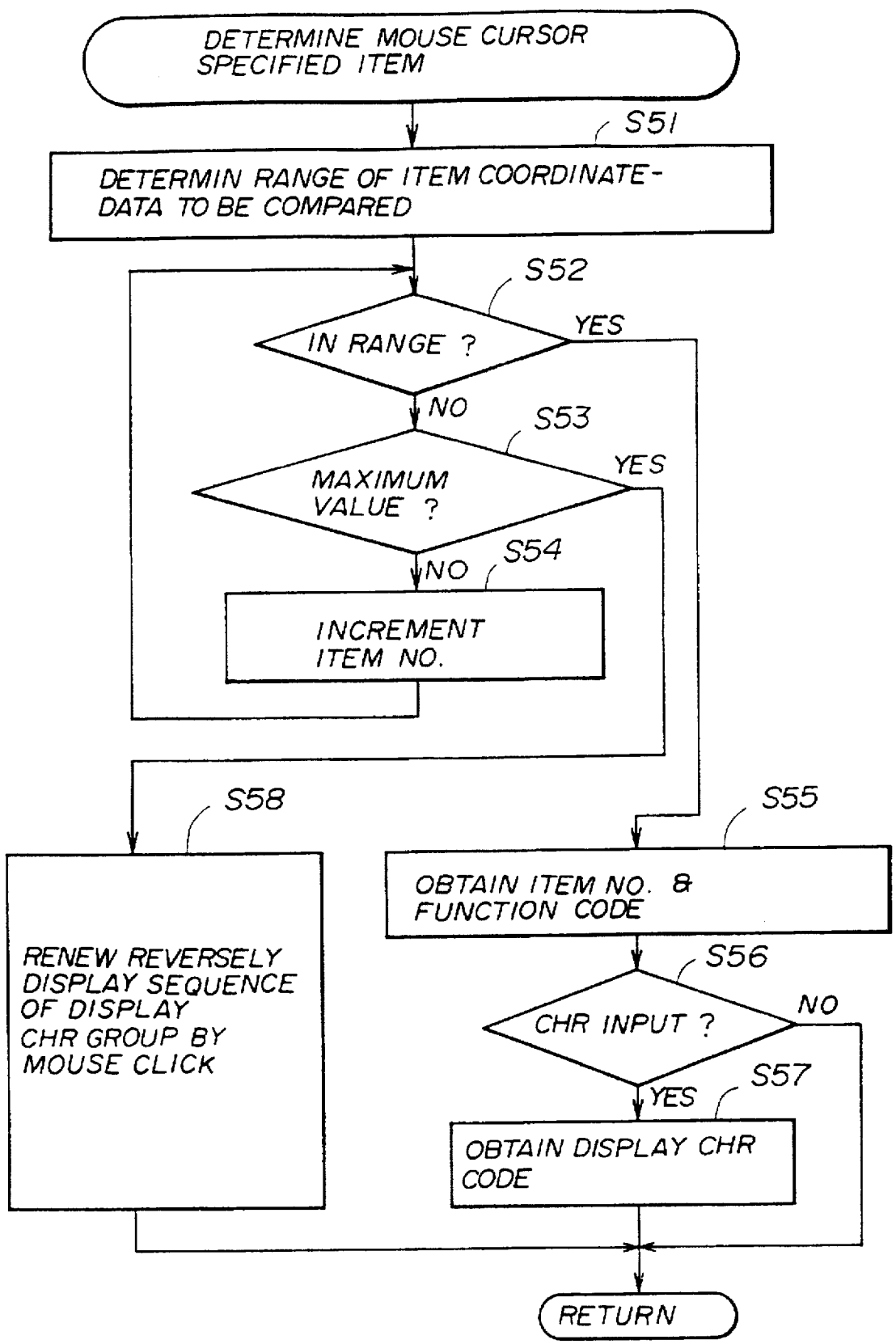
FIG. 16 shows an operation flow chart of processes for determining the display character code corresponding to the item specified by the mouse cursor in the inputting apparatus shown in FIG. 6.

The processes for assigning the item specified by the mouse cursor will be now described with reference to FIG. 16.

The range of the item coordinate-data for comparison is determined (S51), then, it is determined (S52) whether or not the coordinates corresponding to the position of the mouse cursor MC are within the range of the item coordinate-data.

When the above coordinates are not within the range (No in S52), it is determined (S53) whether or not the item number is the maximum value. Then, when it is the maximum value (Yes in S53) and when the mouse button has also been clicked, the direction of the display changing sequence of the group of display characters is reversed (changed) (S58). When the mouse button has not been clicked at the time, the operation slow is returned to the processes shown in FIG. 14.

Further, when the result of the determination in S53 is No, that is, when the item number is not the maximum value, the item number is then counted up (S54), the operation flow being then returned to the step of determining whether or not the above-mentioned coordinates are in the range (S52).

Further, when the coordinates corresponding to the position of the mouse cursor MC are within the range of the item coordinate-data (Yes in S52), the item number and the function code are obtained (S55), and it is determined (S56) whether or not the obtained function code indicates input of a character.

When the obtained function code indicates input of the character (Yes in S56), the corresponding display character code is obtained (S57), the operation flow being then returned to the processes shown in FIG. 14. When the obtained function code indicates a process other than input of the character (No in S57), the operation flow is returned to the processes shown in FIG. 14.

Figure 17:
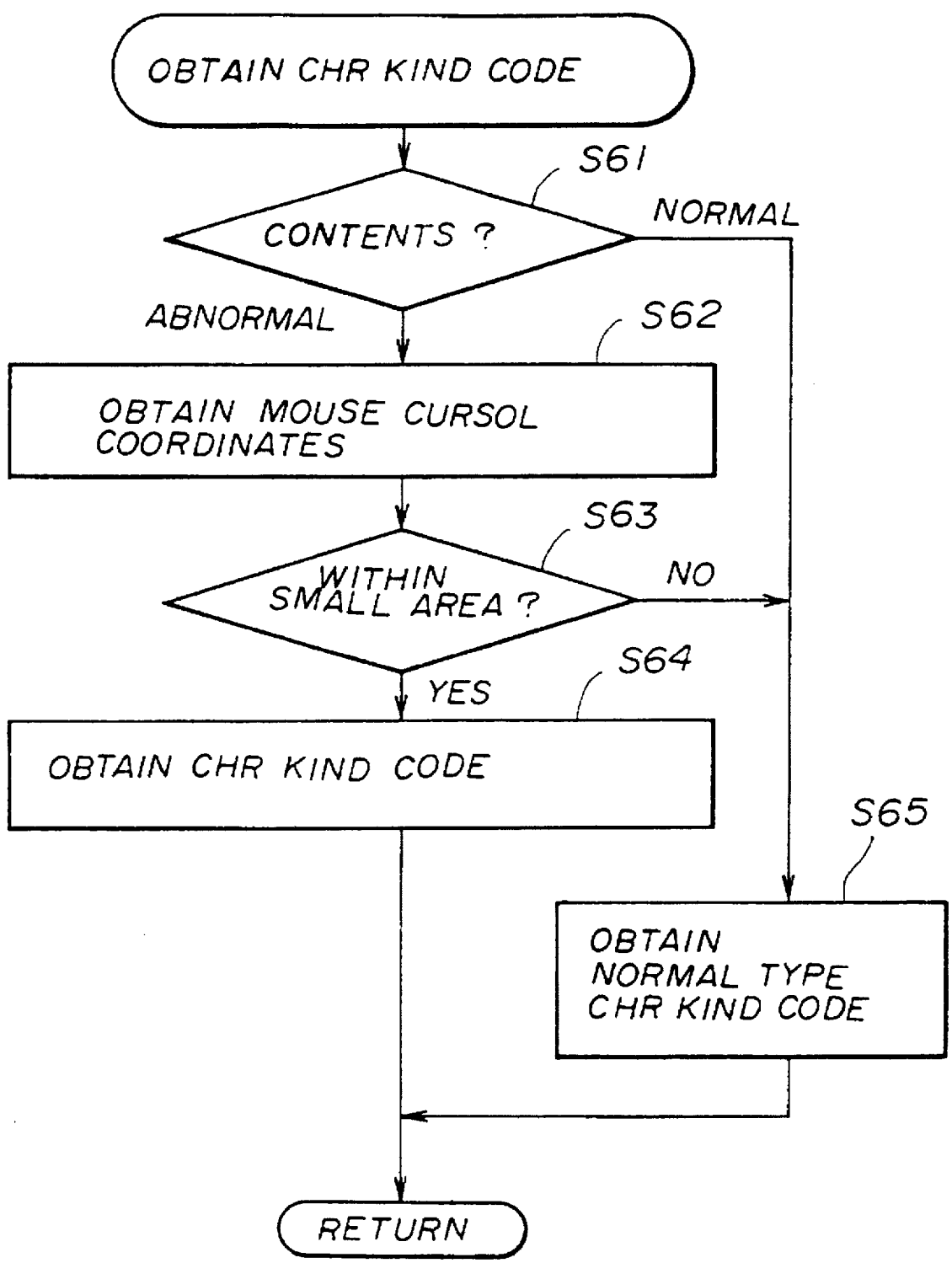
FIG. 17 shows an operation flow chart of processes for obtaining a character kind code in the inputting apparatus of FIG. 6.

The processes for obtaining the character kind code will now be described with reference to FIG. 17.

It is determined (S61) whether or not the contents of the item type are normal, then, when they are normal, a character kind code of the normal type having been obtained (S65), the operation flow is returned to the processes shown in FIG. 14.

When the above mentioned contents are not normal in S61, the coordinates corresponding to the position of the mouse cursor MC are obtained (S62), and it is determined (S63) whether or not the mouse cursor MC is located on the small area provided in the item display area. When the mouse cursor is not within the small area (No in S63), a character kind code of the normal type is obtained (S65), the operation flow being then returned to the processes shown in FIG. 14. When the mouse cursor is within the small area (Yes in S63), the corresponding character kind code is obtained, and the operation flow is returned.

Figure 18:
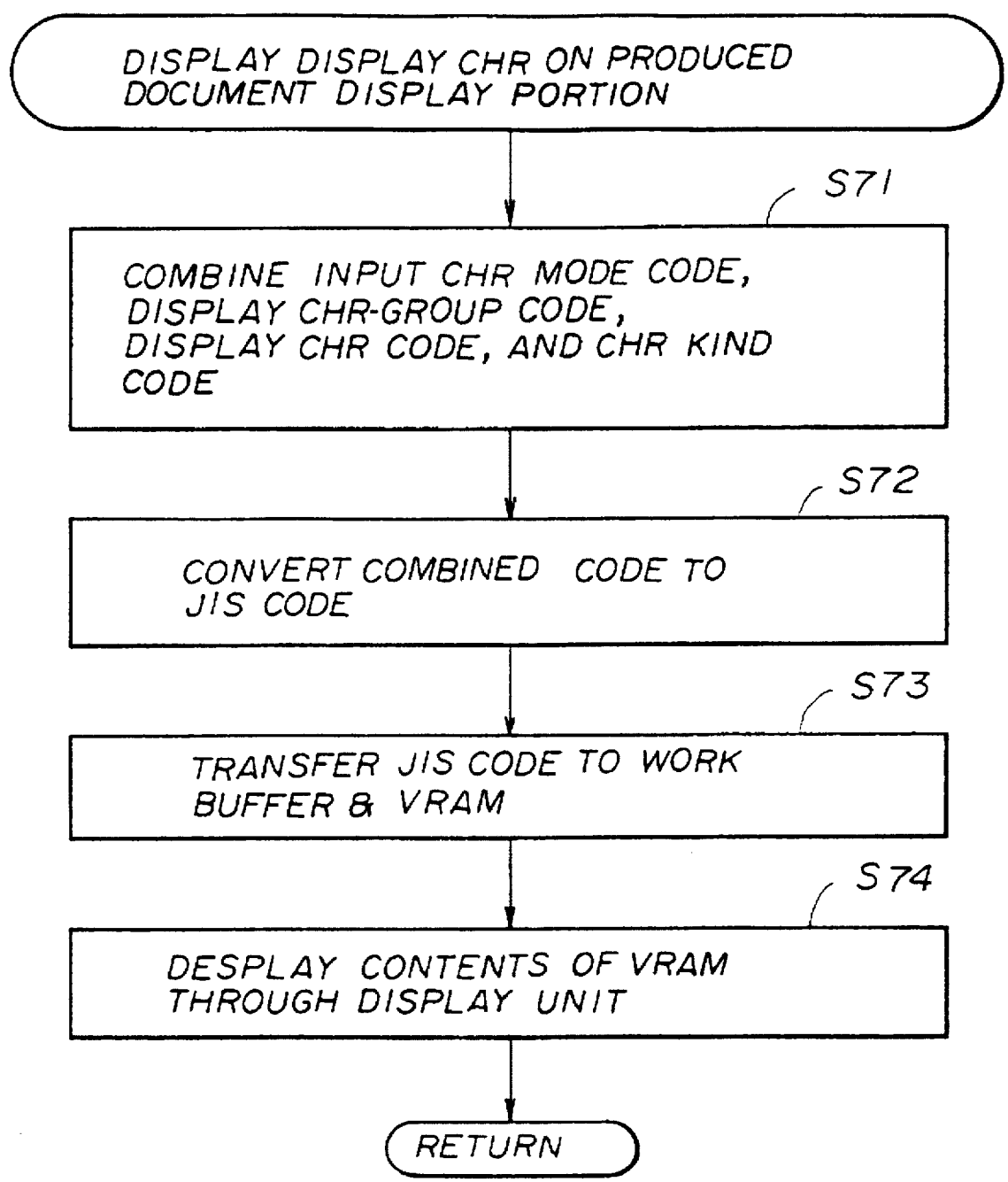
FIG. 18 shows an operation flow chart of processes for displaying the display character corresponding to the selected item on the produced document display portion of the soft keyboard of FIG. 1 in the inputting apparatus shown in FIG. 6.

The processes for displaying the display character on the produced document display portion will now be described with reference to FIG. 18.

The input character mode code, the display character-group code, the display character code, and the character kind code are combined (S71) together, the composed code being then converted to the corresponding JIS code (S72).

Then, the obtained JIS code is transferred to the work buffer 6 and to the VRAM 4 (S74), the contents of the VRAM 4 being then displayed through the display unit (S74), and the operation flow is returned to the processes shown in FIG. 14.

Figure 19:
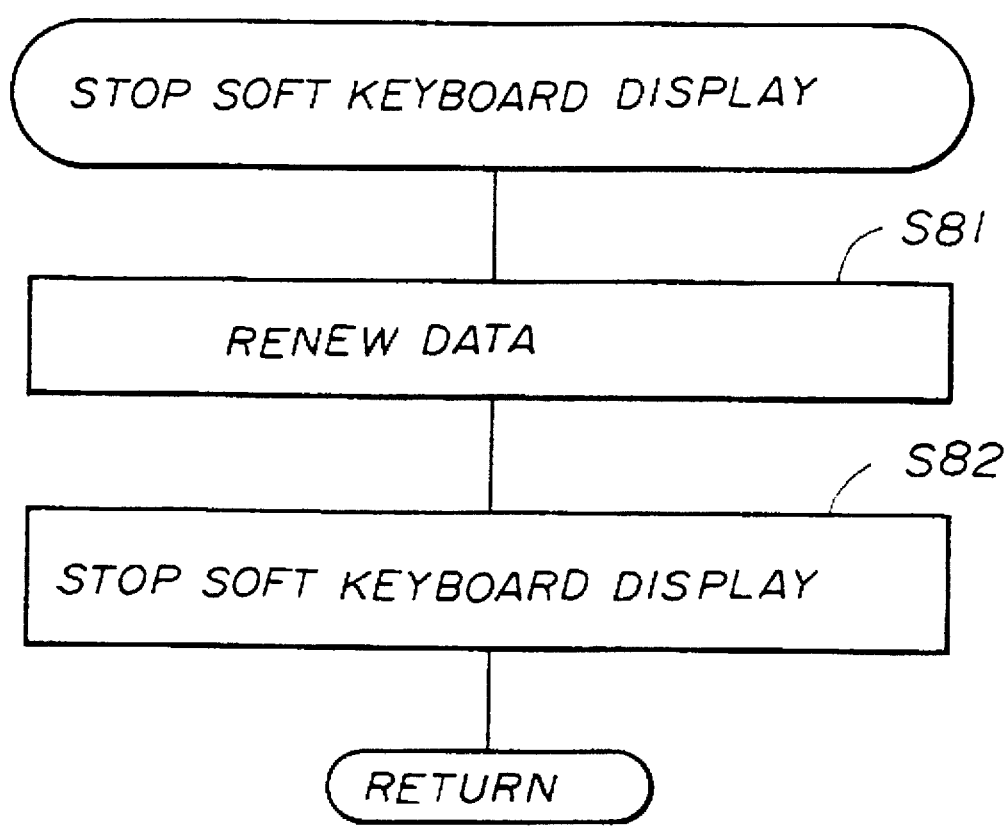
FIG. 19 shows an operation flow chart of processes for stopping the changing of the display of the soft keyboard in the inputting apparatus shown in FIG. 6.

The processes for stopping the display of the soft keyboard will now be described with reference to FIG. 19.

After the data is renewed (S81), the display of the soft keyboard is stopped (S82), the operation flow being then returned to the processes shown in FIG. 12.

Further, the processes in which the position coordinates of the mouse cursor MC and the item coordinate-data are compared with each other in inputting the display characters displayed on the selecting character-display portion, and by which the corresponding information is then displayed on the display unit will now be detailed with reference to FIGS. 20, 21, 22 and 30.

Figure 20:
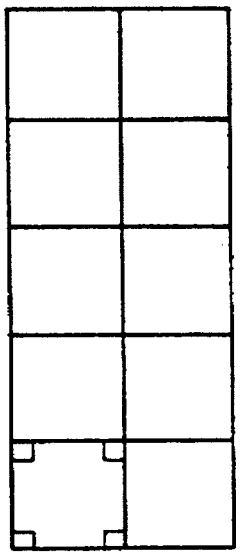
FIG. 20 shows an illustration of one example of an arrangement of character items displayed in the soft keyboard of FIG. 1.

In FIG. 20, 10 items are displayed.

Figure 21:
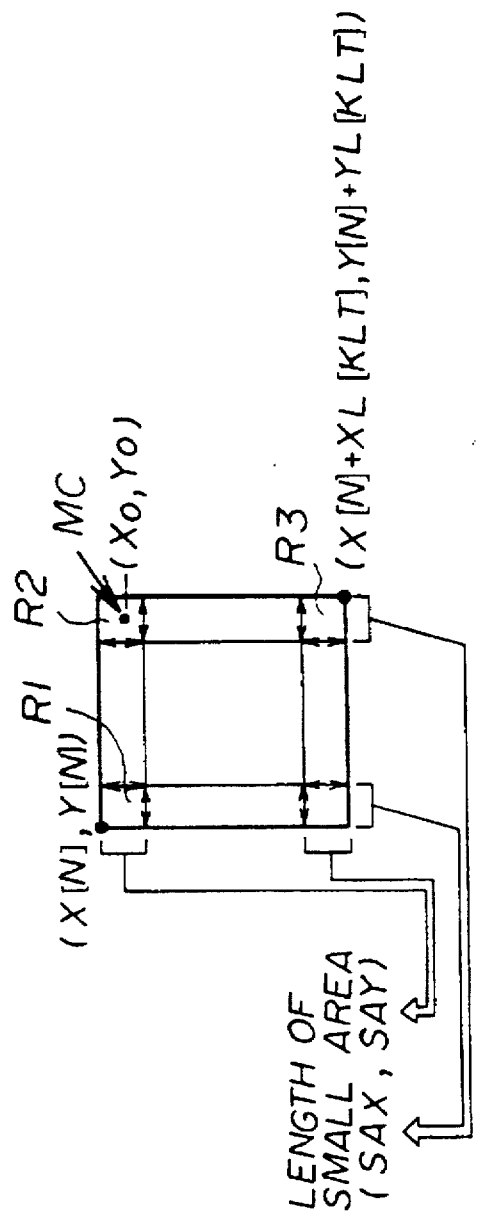
FIG. 21 shows an illustration of each of the character items shown in FIG. 20.

In FIG. 21, areas R1 through R3 are the small areas for specifying that the character displayed on the present item is to be a corresponding double consonant character, sonant character, or p-sound character respectively. Respective coordinates values shown in FIG. 21 will be used in the below description.

Whether or not the mouse cursor MC is located within the display area corresponding to the selecting character-display portion is determined as a result of a calculation such as: a comparison to determine whether or not an X coordinate ($X_0$) of the location of the mouse cursor MC is within an X coordinate range between the starting point (one end) and ending point (another end) coordinates of the selecting character-display portion; and a comparison to determine whether or not a Y coordinate ($Y_0$) of the mouse cursor MC is within a Y coordinate range between the starting point (one end) and ending point (another end) coordinates of the selecting character-display portion.

When it is determined as a result of the above-mentioned determination that the mouse cursor MC is within the display area of the selecting character-display portion, the change of the display of the group of the display characters is stopped. Then, the input character mode code and the display character-group code respectively present at the time the display was stopped are immediately transferred to the work buffer 7, and it is monitored, simultaneously, whether or not the mouse cursor MC touches any of the 10 items shown in FIG. 20.

This monitoring regarding to the X coordinate ($X_0$) and Y coordinate ($Y_0$) is executed, beginning from the particular item number (N) and continuing in sequence of increasing item number (N++). In the monitoring, whether or not the X coordinate ($X_0$) of the mouse cursor MC is within a X coordinate range between a starting point coordinate (X[N]) and an ending point coordinate (X[N]+XL[KLT]) of the item coordinate-data for each item, and whether or not Y coordinate ($Y_0$) of the mouse cursor MC is within a Y coordinate range between a starting point coordinate (Y[N]) and an ending point coordinate (Y[N]+YL[KLT]) of the item coordinate-data for each item is determined.

Then, the item data number (KTN) corresponding to the item number (N) is obtained, the function code corresponding to the item data number (KTN) being then obtained, the corresponding character code being then assigned in accordance with the function code.

Figure 30:
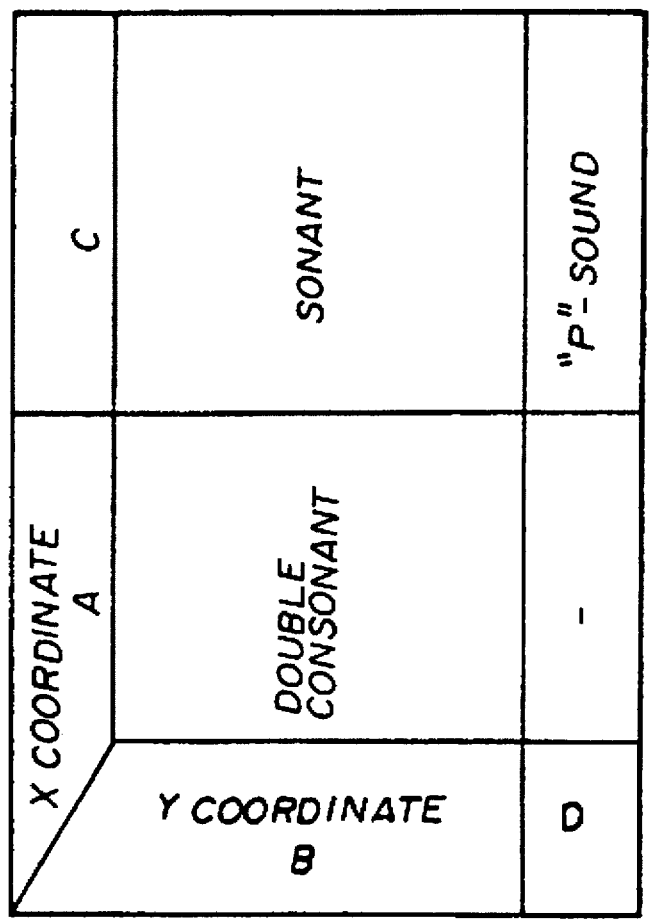
FIG. 30 shows a table of one example of a stored correspondence table for correspondence between position coordinates of the mouse cursor and character codes indicating the double consonant, the sonant and the p-sound.

Then, the corresponding character data is determined in accordance with the input character mode code, the display character-group code, and the display character code. Then, in case the current character may be at least one of the sonant character, the p-sound character, and the double consonant character, it is determined whether or not the mouse cursor MC is located on any of the small areas R1 through R3. References in accordance with which this determination is executed will be described now. As shown in FIG. 30, four heads A, B, C and D are provided. In this example, lengths in the X coordinate direction of the small areas R1 through R3 are the same as each other, the common length is SAX. Further, lengths in the Y coordinate direction of the small areas R1 through R3 are the same as each other, the common length is SAY.

In this determination, when a value obtained as a result of subtracting the starting X coordinate (X[N]) from the X coordinate ($X_0$) of the mouse cursor MC is not less than 1 and not more than SAX, the head A is to be ON. Further, when a value obtained as a result of subtracting the starting Y coordinate (Y[N]) from the Y coordinate ($Y_0$) of the mouse cursor MC is not less than 1 and not more than SAY, the head B is to be ON.

Further, when a value obtained as a result of subtracting the X coordinate ($X_0$) of the mouse cursor MC from the ending point X coordinate (X[N]+XL[KLT]) is not less than 1 and not more than SAX, the head C is to be ON. Further, when a value obtained as a result of subtracting the Y coordinate ($Y_0$) of the mouse cursor MC from the ending point Y coordinate (Y[N]+YL[KLT]) is not less than 1 and not more than SAY, the head D is to be ON.

Then, when both the heads A and B are ON, it is determined that the mouse cursor MC specifies the present character as being the double consonant character, the character kind code corresponding to the consonant character being thus obtained.

Further, when both the heads A and C are ON, it is determined that the mouse cursor MC specifies the present character as being the sonant character, the character kind code corresponding to the sonant character being thus obtained.

Further, when both the heads C and D are ON, it is determined that the mouse cursor MC specifies the present character as being the p-sound character, the character kind code corresponding to the p-sound character being thus obtained.

Figure 22:
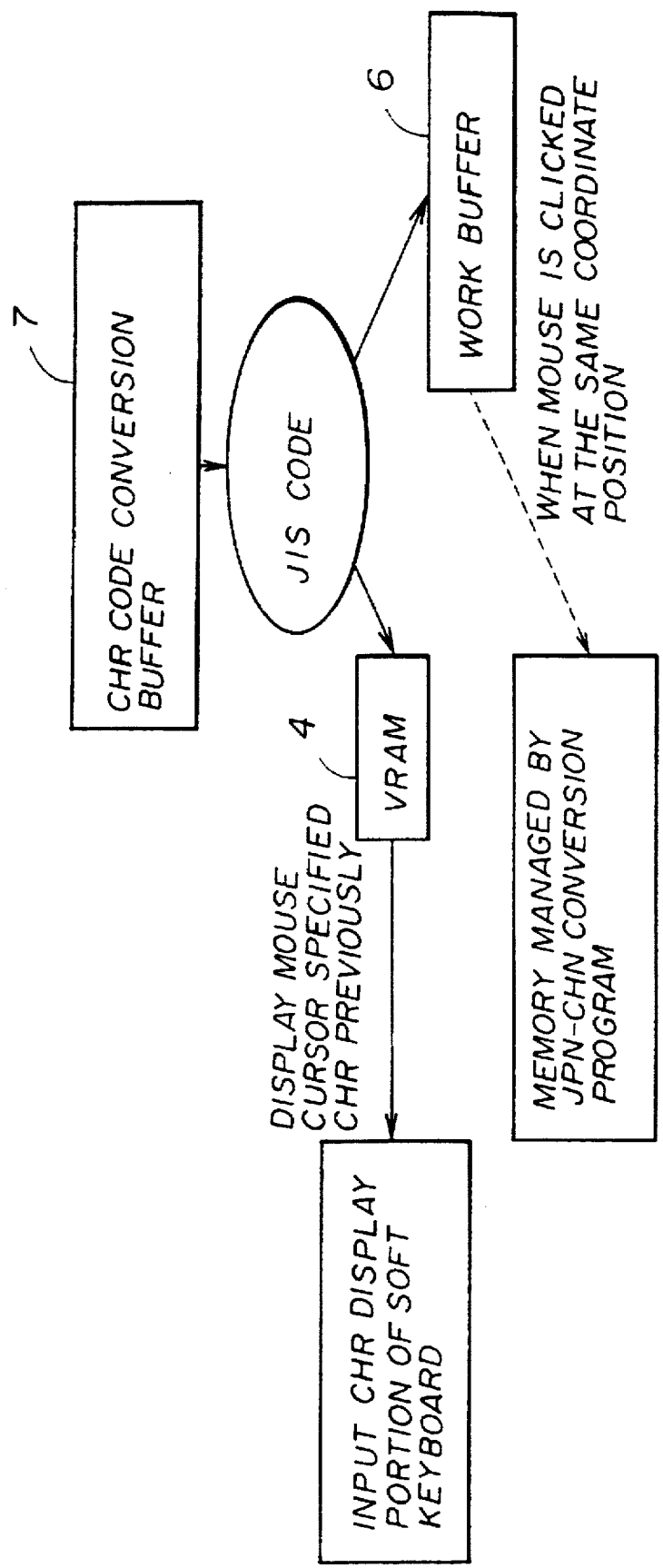
FIG. 22 shows an illustration of operations corresponding to the character display in the inputting apparatus shown in FIG. 6.

Then, as shown in FIG. 22, the formal display character code is obtained as a result of combining the input character mode code, the display character-group code, the display character code, and the character kind code, the character code conversion buffer then converting the obtained display character code to the corresponding JIS code, the obtained JIS code then being transferred to the VRAM, and the corresponding character then being displayed on the display unit.

Then, the JIS code is stored in the work buffer. And then, when the mouse button is clicked, the JIS code is transferred to the memory managed by the Japanese-Chinese character conversion program, the JIS code then being a material to be used in the conversion to the corresponding Chinese character.

The processes for fixing the item specified by the mouse cursor will now be detailed with reference to FIGS. 23 and 24.

Figure 23:
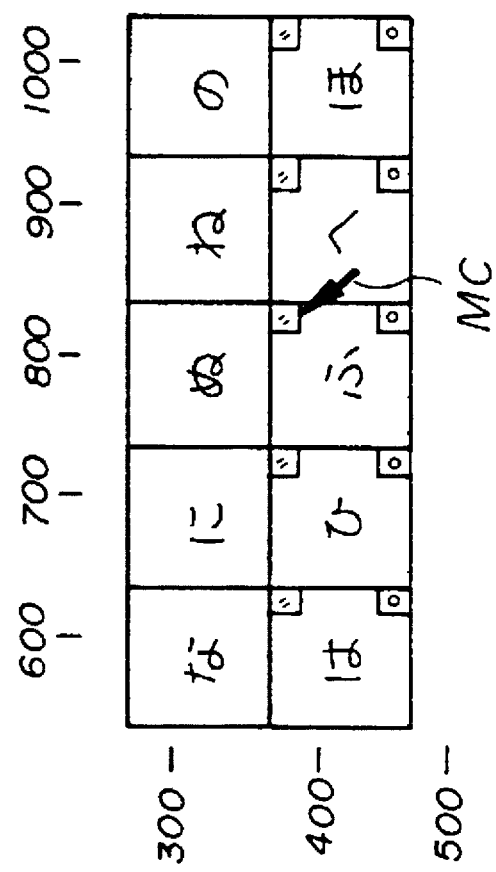
FIG. 23 shows an illustration of one example of a group of items displayed on a selecting character-display portion shown in FIG. 1.

The group of display characters shown in FIG. 23 has 10 items consisting of Japanese characters Na through No and HA through Ho.

A case where the mouse cursor MC specifies the small area R2 specifying the sonant character provided in the item corresponding to the Japanese character Fu will now be described.

Figure 24:
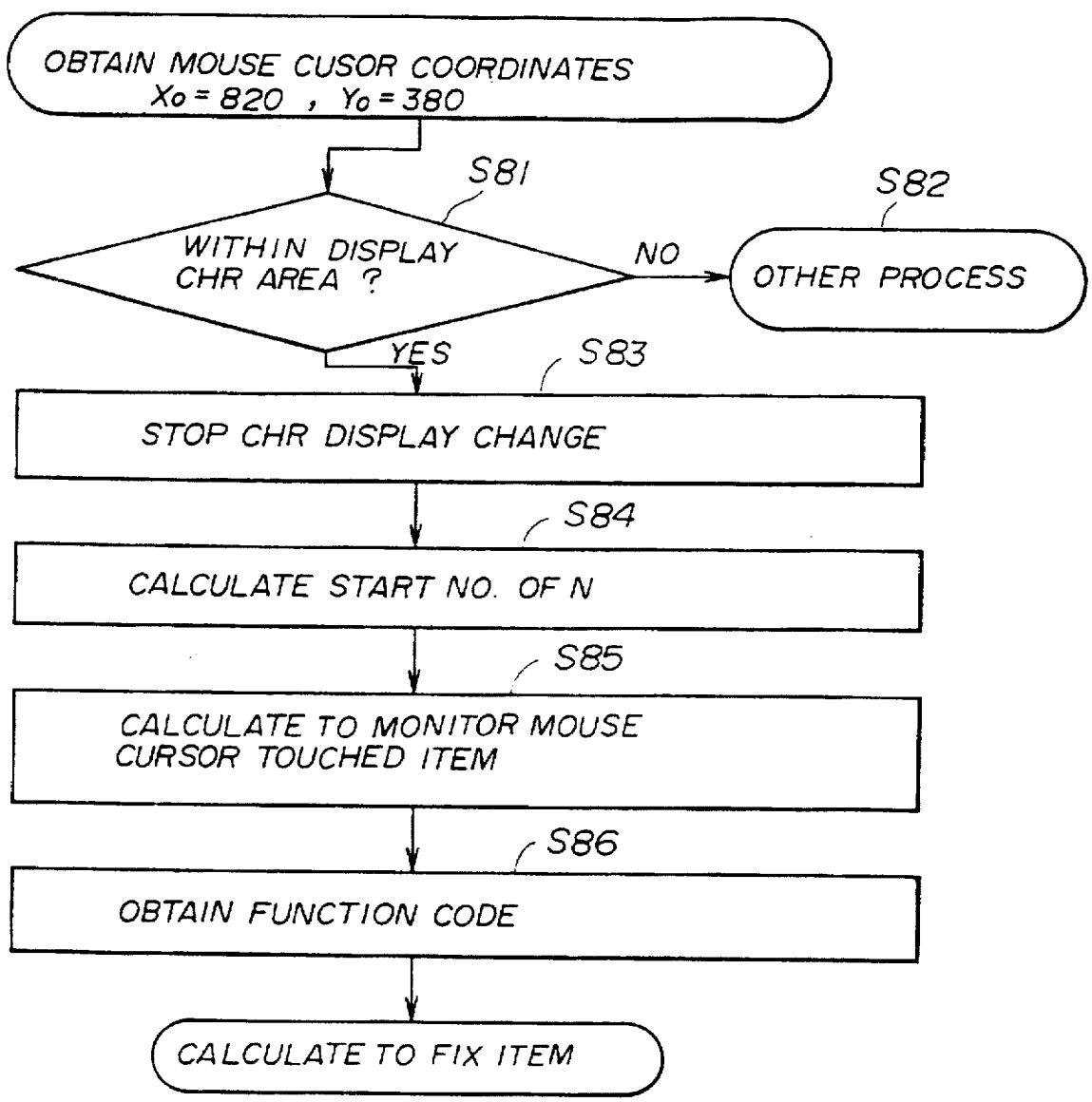
FIG. 24 shows an operation flow chart of processes for determining the item specified by the mouse cursor.

As shown in FIG. 24, the position coordinate: $X_0=820$, and $Y_0=380$ for the mouse cursor MC is obtained. Then, it is determined (S81) whether or not the mouse cursor MC is within the display character area in accordance with the following formula (1):

$$540 \leq X_0 \leq 1030$$

and $$260 \leq Y_0 \leq 465 \quad (1).$$

When the mouse cursor MC is not within the display character area, the other processes are executed (S82). When it is within the area (Yes in S81), the change of the character display is stopped (S83). Then, a starting number of N is determined (S84) in accordance with the following formula (2):

$$
\begin{array}{lll}
Y_0 \leq 210 & \text{then} \quad N-1; & (2) \\
Y_0 > 210 \text{ AND } X_0 < X[8] & \text{then} \quad N-2; & \\
Y_0 > 210 \text{ AND } X_0 < X[13] & \text{then} \quad N-8; \quad \text{and} & \\
Y_0 > 210 \text{ AND } X_0 < X[28] & \text{then} \quad N-13. &
\end{array}
$$

After the starting number of N is determined, the calculation for monitoring the item to which the mouse cursor MC touches is executed (S86) in accordance with the following formula (3):

$$N \leq MAX;$$

$$X[N] \leq X_0 \leq (X[N]+XL[KLT])$$

and $$Y[N] \leq Y_0 \leq (Y[N]+YL[KLT]) \quad (3).$$

In this example, 380>210 AND 820<1250, thus X[28] is obtained, and it is determined that N is started from 13.

Then, when N=20, then $735 \leq 820 \leq (735+100)$ AND $365 \leq 380 \leq (365+100)$. Thus, the function display code KTN=57 is obtained, and the corresponding display character code "7" is input.

Figure 25:
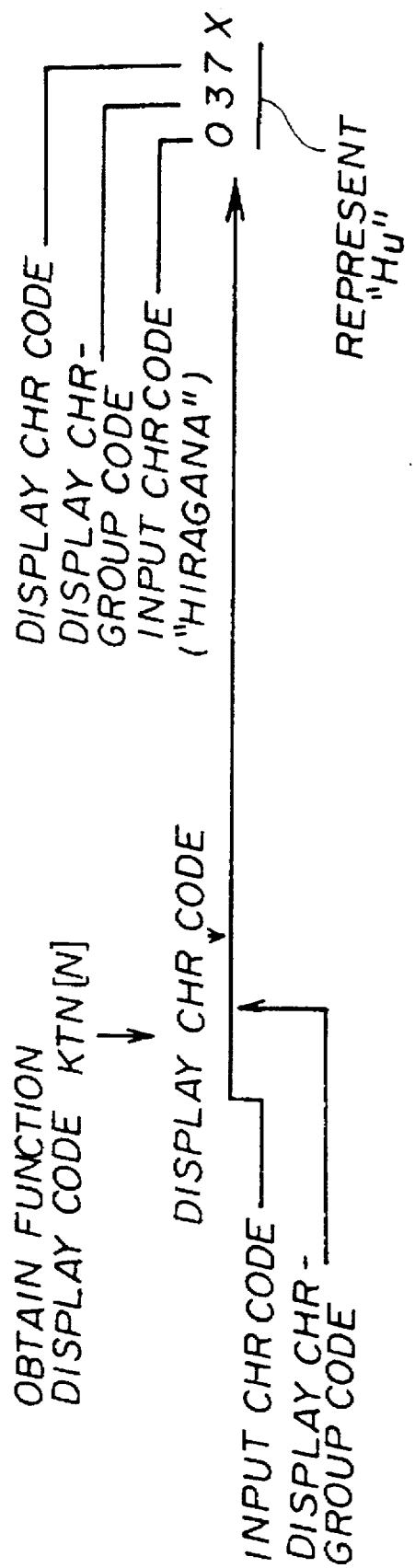
FIG. 25 shows an illustration of an operation flow in which a function code is obtained in the inputting apparatus shown in FIG. 6.

As shown in FIG. 25, by inputting the display character code "7", the input character code (hiragana) "0", and the display character-group code "3" are input, then in accordance with the function code "037x", it is determined that the specified item indicates Fu.

Then, in accordance with the function code "037x" of this item, it is determined that this item may be the sonant character and the p-sound character. Then it is determined, in accordance with the following formula (4), to which of the small areas of this item, which areas specify the sonant character and the p-sound character respectively, the position coordinates of the mouse cursor MC belongs.

$$A: 0 < X_0 - X[N] \leq SAX;$$

$$B: 0 < Y_0 - Y[N] \leq SAY;$$

$$C: 0 < X[N]+XL[KLT]-X_0 \leq SAX;$$

and $$D: 0 < Y[N]+YL[KLT]-Y_0 \leq SAY \quad (4).$$

Then, KLT[20]=2, and the result (5)s are thus obtained:

$$A: 0 < (820-785) \leq 20 \text{ is not true};$$

$$B: 0 < (380-365) \leq 20 \text{ is true};$$

$$C: 0 < (735+100-820) \leq 20 \text{ is true};$$

and $$D: 0 < (365+100-380) \leq 20 \text{ is not true} \quad (5).$$

Thus, the heads B and C become ON.

Thus, it is determined that the mouse cursor MC is located in the small area specifying the sonant character, in the item corresponding to Fu.

Thus, the character kind code "1" is input in the fourth figure of the function code "037x", and the character Bu is here displayed in accordance with the formal display character code "0371"

The present invention is not limited to the above described embodiment, and variations and modifications may be made without departing from the scope of the present invention.

What is claimed is:

1. An input apparatus comprising:
   display changing means for automatically periodically changing, in a predetermined sequence, which group of items, from among a plurality of groups of items, is displayed onto a screen depiction of a keyboard on a screen; and
   means for displaying a cursor on the screen for selecting an input item from among the items of a displayed group, said cursor being positionable on the screen whereat the group of items of said plurality of groups of items is displayed, the item on which said cursor is located when a selection element corresponding to said cursor being activated is thus selected.

2. The input apparatus according to claim 1, wherein said display changing means changes the display at predetermined intervals while said cursor is not located on the group of items of said plurality of groups of items.

3. The input apparatus according to claim 1, wherein an item area in which an item of said plurality of groups of items is displayed has a small area therein for specifying a predetermined mark to be input with the corresponding item, and said cursor being located on the small area when said button is clicked results in the corresponding item being input with the mark attached thereto.

4. The input apparatus according to claim 3, wherein said predetermined mark comprises one of: marks which respectively produce, as a result of being respectively attached to the clear sound characters, the sonant characters, and the p-sound characters in the Japanese characters hiragana and katakana; or, in other alphabets, an umlaut, a subscript, and a superscript.

5. The input apparatus according to claim 1, wherein an item area in which is displayed an item of a group of items of said plurality of groups of items has a small area therein for specifying a predetermined modification to be performed on information corresponding to the item, and said cursor being located on the small area when said button is clicked results in the information corresponding to the item being input after having had the corresponding predetermined modification performed thereon.

6. The input apparatus according to claim 5, wherein said predetermined modification is one of: one of the Japanese hiragana and katakana being converted from the normal size to the corresponding double consonant character size, and the Capital character of an alphabet being converted to the corresponding lowercase letter.

7. The input apparatus according to claim 1, further comprising an inputting item display means for displaying thereon an item of said plurality of groups of items on which item said cursor is located.

8. The input apparatus according to claim 1, wherein said cursor has functions in which clicking said button results in changing a display of function specification on a function specification area on said screen from among a plurality of function specifications.

9. The input apparatus according to claim 3, wherein:
said small area provided in the item area is located at a corner of the item area which is square-shaped.

10. The input apparatus according to claim 5, wherein:
said small area provided in the item area is located at a corner of the item area which is square-shaped.

11. The input apparatus according to claim 3, further comprising:
area determining means for determining whether or not said cursor is located at said small area;
character extracting means for extracting a predetermined character if the determination result supplied by said determining means is the positive result; and
display means for displaying said predetermined character extracted by said character extracting means.

12. The input apparatus according to claim 5, further comprising:
area determining means for determining whether or not said cursor is located at said small area;
character extracting means for extracting a predetermined character if the determination result supplied by said determining means is the positive result; and
display means for displaying said predetermined character extracted by said character extracting means.

13. An input apparatus comprising:
display changing means for automatically periodically changing, either in a first sequence or in a second sequence which is the reverse of said first sequence, which group of items, from among a plurality of groups of items, is displayed onto a screen depiction of a keyboard on a screen, and
means for displaying a cursor on the screen where the group of items of said plurality of groups of items is displayed, said cursor being usable for selecting an input item from among the displayed group of items;
wherein the item on which said cursor is located when a selection element corresponding to said cursor is activated is the input item; and
wherein said cursor is further usable for selecting a selected sequence from among said first and second sequences in which said display changing means changes the display as a result of said selection element being activated.

14. The input apparatus according to claim 13, further comprising retaining display means for always displaying an item which is selected frequently.

15. An input method comprising:
(a) automatically periodically changing, in a predetermined sequence, which group of items, from among a plurality of groups of items, is displayed onto a screen depiction of a keyboard; and
(b) selecting an input item from among the items of a displayed group,
wherein said step (b) uses a cursor, said cursor being displayed on a screen where the group of items of said plurality of groups of items is displayed, wherein the item on which said cursor is located when a button corresponding to said cursor is clicked is thus selected.

16. The input apparatus according to claim 15, wherein said step (a) causes the display to be changed at predetermined intervals while said cursor is not located on the group of items of said plurality of groups of items.

17. The input method according to claim 15, wherein an item area in which is displayed an item of said group of said plurality of groups of items has a small area therein for specifying a predetermined mark to be input with the corresponding item, and said cursor being located on the small area when said button is clicked results in the corresponding item being input with the mark attached thereto.

18. The input method according to claim 17, wherein said predetermined mark comprises one of: marks which respectively produce, as a result of being respectively attached to the clear sound characters, the sonant characters, and the p-sound characters in the Japanese hiragana and katakana, or, in the case of character of an alphabet, an umlaut, a subscript, and a superscript.

19. The input mehtod according to claim 15, wherein an item area in which is displayed an item of said group of said plurality of groups of items has a small area therein for specifying a predetermined modification to be performed on information corresponding to the item, and said cursor being located on the small area when said button is clicked results in the information corresponding to the item being input after having had the corresponding predetermined modification performed thereon.

20. The input method according to claim 19, wherein said predetermined modification is one of: the one of the Japanese hiragana and katakana being converted from the normal size to the corresponding double consonant character size, and the Capital character being converted to the corresponding lowercase letter.

21. The input method according to claim 15, further comprising a step (g) of displaying on an inputting item display portion an item of items of the displayed group of items of said plurality of groups of items on which item said cursor is located.

22. The input method according to claim 15, wherein said cursor has functions in which clicking said button results in changing a display of a function specification on a function specification area on said screen from among a plurality of function specifications.

23. The input method according to claim 17, wherein:
said small area provided in the item area is located at a corner of the item area which is square-shaped.

24. The input method according to claim 19, wherein:
said small area provided in the item area is located at a corner of the item area which is square-shaped.

25. The input method according to claim 7, further comprising:
determining whether or not said cursor is located at said small area to form a determination result;
extracting a character if the determination result is a positive result; and displaying said predetermined character extracted by said character extracting step.

26. The input method according to claim 19, further comprising:

determining whether or not said cursor is located at said small area to form a determination result;

extracting a character if the determination result is a positive result; and displaying said predetermined character extracted by said character extracting step.

27. An input method comprising:

a) automatically periodically changing, either in a first sequence or in a second sequence which is the reverse of said first sequence, which group of items, from among a plurality of groups of items, is displayed onto a screen depiction of a keyboard;

b) using a cursor being displayed on the screen on which the group of items of said plurality of groups of items is displayed, for selecting an input item from among the displayed group of items, wherein the item on which said cursor is located when a button corresponding to said cursor is clicked is the input item; and c) further using said cursor for selecting a selected sequence from among said first and second sequences, in which said changing step changes the display as a result of said button being clicked.

28. The input method according to claim 27, further comprising a step (f) always displaying an item which is selected frequently.

29. An input apparatus comprising:

display changing means for automatically periodically changing, in a predetermined sequence, which group of items, from among a plurality of groups of items, is displayed onto a screen depiction of a keyboard; and item selecting means for selecting an input item from among the items of a displayed group, wherein the automatic periodic changing action of the group of items displayed on the screen, which items may be selected, is started and stopped according to the position of a cursor which is displayed on said screen.

30. The input apparatus according to claim 29, further comprising:

cursor position detecting means for detecting whether or not said cursor is located in said group of items displayed on said screen.

31. The input apparatus according to claim 29, wherein:

each group of said groups of items includes different Japanese characters in their ordinary order.

32. The input apparatus according to claim 29, wherein:

said screen has a selected character display area therein separated from item areas in which said group of items are displayed; and said selected character display area is used to display a character which is selected from the characters represented by said group of items displayed on said screen.

33. The input apparatus according to claim 32, wherein:

said selected character display area displays a character which is represented by the item in the item area in which the cursor is located; and the character displayed in said selected character display area is fixed when a button provided on said input apparatus is clicked and thus said selected character display area displays a character which is represented by the item in the item area in which the cursor is located, together with the fixed character.

34. The input apparatus according to claim 29, further comprising:

area determining means for determining in which item area said cursor is located;

character extracting means for extracting the character represented by the item in said item area; and display means for displaying said character on said selected character display area.

35. An input method comprising:

(a) automatically periodically changing, in a predetermined sequence, which group of items, from among a plurality of groups of items, is displayed onto a screen depiction of a keyboard; and (b) selecting an input item from among the items of a displayed group, wherein the automatic periodic changing action of the group of items displayed on the screen, which items may be selected, is started and stopped according to the position of a cursor which is displayed on said screen.

36. The input method according to claim 35, further comprising a cursor position detecting step comprising:

detecting whether or not said cursor is located in said group of items displayed on said screen.

37. The input method according to claim 35, wherein:

each group of said groups of items includes different Japanese characters in their ordinary order.

38. The input method according to claim 35, wherein:

said screen has a selected character display area therein separated from item areas in which said group of items are displayed; and said selected character display area is used to display a character which is selected from the characters represented by said group of items displayed on said screen.

39. The input method according to claim 38, wherein:

said selected character display area displays a character which is represented by the item in the item area in which the cursor is located; and the character displayed in said selected character display area is fixed when a button provided on said input apparatus is clicked and thus said selected character display area displays a character which is represented by the item in the item area in which the cursor is located, together with the fixed character.

40. The input method according to claim 35, further comprising:

determining which item area said cursor is located;

extracting the character represented by the item in said item area; and displaying said character on said selected character display area.

* * * * *